US012411056B2

(12) United States Patent
Polk, Jr. et al.

(10) Patent No.: US 12,411,056 B2
(45) Date of Patent: Sep. 9, 2025

(54) HIGH OUTPUT ACOUSTIC SYSTEM FOR DIRECT FIELD ACOUSTIC TESTING

(71) Applicant: MSI DFAT LLC, Baltimore, MD (US)

(72) Inventors: Matthew S. Polk, Jr., Gibson Island, MD (US); Marcos A. Underwood, Cupertino, CA (US); Michael D. Sullivan, Eldersburg, MD (US)

(73) Assignee: MSI DFAT LLC, Baltimore, MD (US)

( * ) Notice: Subject to any disclaimer, the term of this patent is extended or adjusted under 35 U.S.C. 154(b) by 591 days.

(21) Appl. No.: 17/548,959

(22) Filed: Dec. 13, 2021

(65) Prior Publication Data

US 2022/0244134 A1 Aug. 4, 2022

Related U.S. Application Data

(60) Provisional application No. 63/124,406, filed on Dec. 11, 2020.

(51) Int. Cl.
| | | |
|---|---|---|
| *G01N 29/14* | (2006.01) | |
| *G01M 7/02* | (2006.01) | |
| *G01N 29/04* | (2006.01) | |
| *G01N 29/26* | (2006.01) | |
| *G01N 29/44* | (2006.01) | |
| *H04R 3/00* | (2006.01) | |
| *H04R 3/12* | (2006.01) | |
| *H04R 5/02* | (2006.01) | |

(52) U.S. Cl.
CPC ............ *G01M 7/025* (2013.01); *G01N 29/04* (2013.01); *G01N 29/14* (2013.01); *G01N 29/26* (2013.01); *G01N 29/44* (2013.01); *H04R 3/005* (2013.01); *H04R 3/12* (2013.01); *H04R 5/02* (2013.01)

(58) Field of Classification Search
CPC ....... G01M 7/025; G01N 29/04; G01N 29/14; G01N 29/44; H04R 3/005; H04R 3/12; H04R 5/02
USPC .......................................................... 73/649
See application file for complete search history.

(56) References Cited

U.S. PATENT DOCUMENTS 9,109,972 B2    8/2015    Larkin et al.
9,683,912 B2    6/2017    Larkin et al.
(Continued)

OTHER PUBLICATIONS

Stasiunas, et al., "Performing Direct-Field Acoustic Test Environments on a Sandia Flight System to Provide Data for Finite Element Simulation", Sandia National Laboratories, 2016: DOI: 10.1007/978-3-319-30084-9_25.
(Continued)

*Primary Examiner* — Peter J Macchiarolo
*Assistant Examiner* — Rodney T Frank
(74) *Attorney, Agent, or Firm* — Medler Ferro Woodhouse & Mills PLLC

(57) ABSTRACT

A direct field acoustic testing system comprising a control microphone, a controller operatively coupled to the control microphone such that the controller receives at least one input signal from the control microphone, and a plurality of acoustic transducer groups receiving an electronic signal from the controller, each transducer group including at least one acoustic transducer. An average power density of the direct field acoustic testing system for a pre-determined acoustic test spectrum being equal to or greater than 46 acoustic watts per square meter of total active acoustic transducer radiating surface area.

21 Claims, 25 Drawing Sheets

(56) References Cited

U.S. PATENT DOCUMENTS

| | | | |
|---|---|---|---|
| 10,014,959 B2 * | 7/2018 | Larkin | G01M 7/00 |
| 10,295,434 B2 | 5/2019 | Underwood et al. | |
| 10,317,373 B2 | 6/2019 | Larkin et al. | |
| 2001/0032510 A1 | 10/2001 | Eagan et al. | |
| 2002/0108631 A1 | 8/2002 | Madanshetty | |
| 2015/0138916 A1 | 5/2015 | Larkin et al. | |
| 2020/0232874 A1 | 7/2020 | Underwood | |

OTHER PUBLICATIONS

Marcos A. Underwood, "Comparisons of Structural Response of a Test Article Excited by DFAT Diffuse and Non-Diffuse Acoustic Fields", 91st Shock and Vibration Symposium, Sep. 2021.

International Search Report and Written Opinion, International Application No. PCT/US21/63078, Apr. 5, 2022.

Mcnelis, et al., "Structural Dynamic Assessment of the GN2 Piping System for NASA's New and Powerful Reverberant Acoustic Test Facility NASA/TM-2012-2017610", Jun. 1, 2012, pp. 1-38.

Larkin, et al., "Recent Developments in Direct Field Acoustic Testing", 26th Space Simulation Conference 2101: Annapolis, MD, Oct. 18-21, 2010, pp. 465-492.

Rouse, et al., "Analytical Modeling of the Acoustic Field during a Direct Field Acoustic Test", Journal of teh IEST, US, col. 54, No. 2, Oct. 1, 2011, pp. 1-53.

Extended European Search Report, EP Application No. 21904542.4, mailed Sep. 24, 2024.

* cited by examiner

Test Specification, 146.8db OASPL, 1/3rd Octave Bands

| n | Bottom of Band | Center Frequency (Hz) | Top of Band | Frequency Band SPL |
|---|---|---|---|---|
| 1 | 17.8 | 20.0 | 25.0 | - |
| 2 | 22.3 | 25.0 | 28.1 | - |
| 3 | 28.1 | 31.5 | 35.4 | 134.0 |
| 4 | 35.6 | 40.0 | 44.9 | 134.5 |
| 5 | 44.5 | 50.0 | 56.1 | 135.0 |
| 6 | 56.1 | 63.0 | 70.7 | 135.5 |
| 7 | 71.3 | 80.0 | 89.8 | 136.0 |
| 8 | 89.1 | 100.0 | 112.2 | 136.5 |
| 9 | 111.4 | 125.0 | 140.3 | 136.5 |
| 10 | 142.5 | 160.0 | 179.6 | 135.5 |
| 11 | 178.2 | 200.0 | 224.5 | 135.0 |
| 12 | 222.7 | 250.0 | 280.6 | 135.0 |
| 13 | 280.6 | 315.0 | 353.6 | 134.5 |
| 14 | 356.4 | 400.0 | 449.0 | 134.0 |
| 15 | 445.4 | 500.0 | 561.2 | 134.0 |
| 16 | 561.3 | 630.0 | 707.2 | 131.0 |
| 17 | 712.7 | 800.0 | 898.0 | 129.5 |
| 18 | 890.9 | 1,000.0 | 1,122.5 | 129.0 |
| 19 | 1,113.6 | 1,250.0 | 1,403.1 | 127.0 |
| 20 | 1,425.4 | 1,600.0 | 1,795.9 | 126.0 |
| 21 | 1,781.8 | 2,000.0 | 2,244.9 | 124.0 |
| 22 | 2,227.2 | 2,500.0 | 2,806.2 | 122.5 |
| 23 | 2,806.3 | 3,150.0 | 3,535.8 | 121.5 |
| 24 | 3,563.6 | 4,000.0 | 4,489.8 | 121.0 |
| 25 | 4,454.5 | 5,000.0 | 5,612.3 | 119.5 |
| 26 | 5,612.7 | 6,300.0 | 7,071.5 | 118.0 |
| 27 | 7,127.2 | 8,000.0 | 8,979.7 | 116.0 |
| 28 | 8,909.0 | 10,000.0 | 11,224.6 | 112.0 |
| | | | OAPSL | 146.8 |

FIG. 2

Test Specification, 149.0db OASPL, 1/3rd Octave Bands

| n | Bottom of Band | Center Frequency (Hz) | Top of Band | Frequency Band SPL |
|---|---|---|---|---|
| 1 | 17.8 | 20.0 | 25.0 | - |
| 2 | 22.3 | 25.0 | 28.1 | - |
| 3 | 28.1 | 31.5 | 35.4 | 136.2 |
| 4 | 35.6 | 40.0 | 44.9 | 136.7 |
| 5 | 44.5 | 50.0 | 56.1 | 137.2 |
| 6 | 56.1 | 63.0 | 70.7 | 137.7 |
| 7 | 71.3 | 80.0 | 89.8 | 138.2 |
| 8 | 89.1 | 100.0 | 112.2 | 138.7 |
| 9 | 111.4 | 125.0 | 140.3 | 138.7 |
| 10 | 142.5 | 160.0 | 179.6 | 137.7 |
| 11 | 178.2 | 200.0 | 224.5 | 137.2 |
| 12 | 222.7 | 250.0 | 280.6 | 137.2 |
| 13 | 280.6 | 315.0 | 353.6 | 136.7 |
| 14 | 356.4 | 400.0 | 449.0 | 136.2 |
| 15 | 445.4 | 500.0 | 561.2 | 136.2 |
| 16 | 561.3 | 630.0 | 707.2 | 133.2 |
| 17 | 712.7 | 800.0 | 898.0 | 131.7 |
| 18 | 890.9 | 1,000.0 | 1,122.5 | 131.2 |
| 19 | 1,113.6 | 1,250.0 | 1,403.1 | 129.2 |
| 20 | 1,425.4 | 1,600.0 | 1,795.9 | 128.2 |
| 21 | 1,781.8 | 2,000.0 | 2,244.9 | 126.2 |
| 22 | 2,227.2 | 2,500.0 | 2,806.2 | 124.7 |
| 23 | 2,806.3 | 3,150.0 | 3,535.8 | 123.7 |
| 24 | 3,563.6 | 4,000.0 | 4,489.8 | 123.2 |
| 25 | 4,454.5 | 5,000.0 | 5,612.3 | 121.7 |
| 26 | 5,612.7 | 6,300.0 | 7,071.5 | 120.2 |
| 27 | 7,127.2 | 8,000.0 | 8,979.7 | 118.2 |
| 28 | 8,909.0 | 10,000.0 | 11,224.6 | 114.2 |
| | | | OAPSL | 149.0 |

FIG. 2A

| FREQ | LEVEL |
|---|---|
| 25.0 | 114.6 |
| 31.5 | 120 |
| 40.0 | 122 |
| 50.0 | 123.5 |
| 63.0 | 124.8 |
| 80.0 | 128.6 |
| 100.0 | 129.4 |
| 125.0 | 128.6 |
| 160.0 | 129.1 |
| 200.0 | 129.1 |
| 250.0 | 129.1 |
| 315.0 | 126.9 |
| 400.0 | 126 |
| 500.0 | 124 |
| 630.0 | 121 |
| 800.0 | 118 |
| 1000.0 | 116 |
| 1250.0 | 114 |
| 1600.0 | 112 |
| 2000.0 | 110.6 |
| 2500.0 | 109.3 |
| 3150.0 | 107.9 |
| 4000.0 | 106.5 |
| 5000.0 | 105.1 |
| 6300.0 | 103.8 |
| 8000.0 | 102.4 |
| 10000.0 | 101 |
| OASPL | 138.46dB |

Reference spectrum for reduced acoustic power density comparison

FIG. 8

| Average Real Drive Power in Watts, Full Stacks vs Reduced Acoustic Power Density | | | |
|---|---|---|---|
| Mid-Range Acoustical Transducers, ~140Hz to 600Hz | MISO | MIMO 4-Drive, Coherence=0.6 | MIMO 4-Drive, Coherence=0 |
| Fully Populated Transducer Stacks | 99.8 | 110.4 | 126.8 |
| 1:2 Flat Panels to Active Transducers | 124.6 | 158.3 | 159.7 |
| 1:2 Diffuser Panels to Active Transducers | 123.0 | 183.7 | 185.0 |

| Average Real Drive Power in db, Relative to Full Stack MISO normalized for Reduced Acoustic Power Density | | | |
|---|---|---|---|
| Mid-Range Acoustical Transducers, ~140Hz to 600Hz | MISO | MIMO 4-Drive, Coherence=0.6 | MIMO 4-Drive, Coherence=0 |
| Fully Populated Transducer Stacks | 0.0 | 0.4 | 1.0 |
| 1:2 Flat Panels to Active Transducers | -0.8 | 0.2 | 0.3 |
| 1:2 Diffuser Panels to Active Transducers | -0.9 | 0.9 | 0.9 |

FIG. 9

HIGH OUTPUT ACOUSTIC SYSTEM FOR DIRECT FIELD ACOUSTIC TESTING

CROSS-REFERENCE TO RELATED APPLICATIONS

The present applications claims under 35 U.S.C. § 119(e) the benefit of the filing date of U.S. Provisional Application No. 63/124,406, filed Dec. 11, 2020, the contents of which are incorporated by reference herein in their entirety.

BACKGROUND OF THE INVENTION

Field of the Invention

The present invention relates generally to the field of vibration testing of objects such as satellites, instrumentation or any other object whose reliability in operation may be evaluated using high intensity vibration testing. Specifically, the present invention relates to the use of direct field acoustic testing systems to perform acoustic vibration testing, to control means to allow direct field acoustic systems to produce an acoustic field conforming to a predetermined specification and to the specification of acoustic transducer systems suitable for achieving higher overall sound pressure levels than previously possible.

Background of the Invention

The specifications of U.S. Pat. Nos. 9,109,972 B2, 9,683,912 B2, 10,014,959 B2, 10,295,434 B2, and 10,317,373 B2 and co-pending U.S. application Ser. No. 16/748,091 (U.S. Patent Publication No. 2020/0232874) are incorporated by reference herein in their entirety. In the field of high intensity acoustic vibration testing of spacecraft it is generally desirable to obtain an acoustic field with a specified spectrum and intensity having a uniform spectral content throughout the space around the Unit Under Test (UUT). The spectrum and intensity of the acoustic field required for testing are determined by many factors including, but not limited to, the type of component or spacecraft being tested and the launch system that will be employed. Until the development of improved methods of Direct Field Acoustic Testing (DFAT), virtually all high intensity acoustic vibration testing was performed in Reverberant Acoustic Testing Facilities (RATF's). Significant advances in DFAT technology providing improved performance in, by way of example and not of limitation, control stability, field uniformity, and lower coherence, has made DFAT a viable alternative to RATF's for many acoustic tests. However, the maximum testing levels available from DFAT systems have remained limited to less than approximately 146.8 db overall sound pressure level (OASPL). As a result, RATF's have remained the only viable choice for acoustic vibration testing at levels above approximately 146.8 db OASPL. As discussed in the previously referenced U.S. Patents and Publication, DFAT has many practical advantages over RATF testing. Accordingly, it would be advantageous to provide a DFAT system capable of higher acoustic output levels to provide a viable alternative to RATF testing at OASPL levels greater than 149 db.

Previous attempts to increase the OASPL levels achievable with a DFAT system have focused on the use of more acoustic transducers with greater maximum output. These attempts have failed due to an incomplete understanding of the acoustic field produced by a DFAT system and a failure to incorporate the unique characteristics of the DFAT acoustic field into the design of the acoustic transducers. Accordingly, in attempting to achieve higher OASPL levels with a DFAT system, it would be advantageous to utilize acoustic transducers designed specifically to complement the characteristics of the acoustic field produced by a DFAT system and the requirements of the test specifications.

SUMMARY OF THE INVENTION

Embodiments hereof include a DFAT system with at least one controllable controller output signal, at least one microphone disposed in an appropriate location to provide at least one acoustical input signal which is used to determine the at least one controllable controller output signal, and a group of at least two acoustical transducers having a maximum acoustic power output such that the combined maximum acoustic output of the at least two acoustical transducers divided by the surface area of the radiating faces of the said at least two acoustical transducers which surround the test volume containing the UUT is greater than the predetermined minimum acoustic power output required to maintain an acoustic field with predetermined characteristics at an OASPL equal to or greater than 149 db surrounding the UUT.

Embodiments hereof also include a DFAT system with at least one microphone disposed in an appropriate location to provide at least one acoustical input signal which is used to determine at least four separately controllable controller output signals and at least four groups of acoustical transducers having a maximum acoustic power output such that the combined maximum acoustic output of the at least four groups of acoustical transducers divided by the surface area of the radiating faces of the at least four acoustical transducers which surround the test volume containing the UUT is greater than the predetermined minimum acoustic power output required to maintain an acoustic field with predetermined characteristics at an OASPL equal to or greater than 149 db surrounding the UUT.

Additional embodiments hereof include a DFAT system operating in either single input single output mode (SISO) or multiple input multiple output mode (MIMO) as described in U.S. Pat. No. 9,109,972 B2 with either the same number of inputs and outputs (Square Control) or different numbers of inputs and outputs (Rectangular Control) as described in U.S. Pat. No. 9,683,912 B2 with at least two groups of acoustical transducers such that the combined maximum acoustic output of the at least two acoustical transducers divided by the surface area of the radiating faces of the said at least two acoustical transducers which surround the test volume containing the UUT is greater than the predetermined minimum acoustic power output required to maintain an acoustic field with predetermined characteristics at an OASPL equal to or greater than 149 db surrounding the UUT.

Further embodiments hereof include the DFAT systems described above wherein the acoustical transducers are optimized for different frequency ranges such that the combined maximum acoustic output of the acoustical transducers producing each of the different frequency ranges divided by the surface area of the radiating faces of all of the acoustical transducers which surround the test volume containing the UUT is greater than the predetermined minimum acoustic power output required to maintain an acoustic field with predetermined characteristics at an OASPL equal to or greater than 149 db surrounding the UUT.

In embodiments hereof, a DFAT system may include a plurality of acoustical transducer groups in a test arrangement having a maximum output of at least 46 acoustic watts per square meter of total transducer radiating area for a spectrum of a pre-established test specification having a difference in the specified in the specified acoustic output SPL of the frequency band with the greatest acoustic level specification and the frequency band with the lowest (non-zero) acoustic level specification of at least 3 db SPL. In other embodiments, the difference in the specified acoustic output SPL of the frequency band with the greatest acoustic level specification and the frequency band with the lowest (non-zero) acoustic level specification of at least 6 db SPL In other embodiments, the difference in the specified acoustic output SPL of the frequency band with the greatest acoustic level specification and the frequency band with the lowest (non-zero) acoustic level specification of at least 9 db SPL.

Further, in any of the embodiments described herein, the frequency bands of maximum outer specification are between 100 Hz and 2 Khz.

In other embodiments, in combination with any of the embodiments herein, the plurality of acoustical transducer groups includes at least two separate sections covering different frequency ranges. Further, in some embodiments, there are different quantities of sections covering different frequency ranges, or, in other words, there are not an equal number of separate sections of transducer groups for each frequency range. In other embodiments, the sections of acoustical transducer groups are optimized such that the difference in headroom available from the two lowest frequency transducer sections is less than 6 db for the predetermined spectra of the test specification.

BRIEF DESCRIPTION OF THE DRAWINGS

Embodiments of the invention will now be described, by way of example only, with reference to the accompanying schematic drawings in which corresponding reference symbols indicate corresponding parts.

FIG. 2 shows a typical test spectrum and acoustic levels.

FIG. 2a shows an example test spectrum at an OASPL level of 149 db.

FIG. 8 shows an example reference spectrum.

FIG. 9 shows comparisons in power requirements in DFAT configurations with fully populated transducers stacks, flat dummy panels replacing one-third of the active transducers, and diffuser dummy panels replacing one-third of the active panels.

DETAILED DESCRIPTION OF EMBODIMENTS OF THE INVENTION

Figure 1:
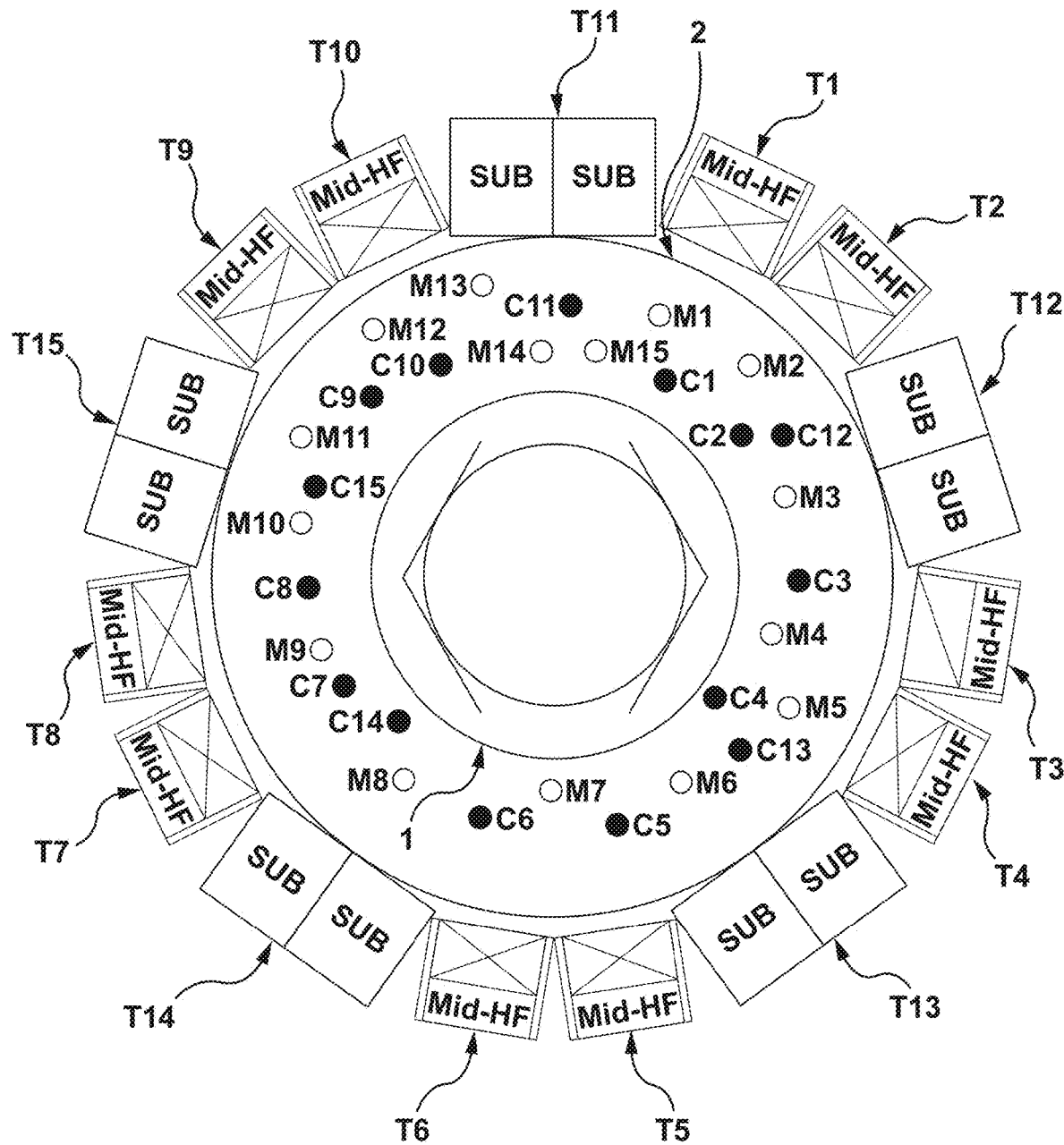
FIG. 1 shows a typical plan view of a DFAT system arranged around a test article (UUT).

Embodiments hereof are now described with reference to the figures where like reference characters/numbers indicate identical or functionally similar elements. While specific configurations and arrangements are discussed, it should be understood that this is done for illustrative purposes only. A person skilled in the relevant art will recognize that other configurations and arrangements can be used without departing from the spirit and scope of the invention.

As used herein, the terms "acoustical transducers" or "loudspeakers" or "electro-dynamic acoustic sources" are used interchangeably, and the use of a specific one of the terms or variations thereof is not meant to impose a different meaning. Further, the term "approximately" or similar terms or symbols in equations are to be interpreted within normal tolerances in the industry for the particular measurement to which they refer.

Referring to FIG. 1, a plan view of a typical DFAT system is shown. Included is a transducer array including groups of electro-dynamic acoustic sources or transducers T1-T15 covering various frequency ranges arrayed around the unit-under test (UUT) 1 in a generally circular arrangement as shown with each group of transducers extending vertically to form a generally cylindrical array of transducers around the UUT 1. The transducer array in the embodiment shown is composed of fifteen groups T1-T15 of transducers, of which ten groups T1-T10 are each composed of fourteen mid-high frequency electro-dynamic loudspeaker systems arranged vertically generally covering the frequency range above 130 Hz and five groups T11-T15 are each composed of two vertical stacks of nine each electro-dynamic sub-woofer loudspeakers generally covering the frequency range from 20 Hz to 180 Hz. Control microphones C1-C15 are disposed at various positions around the UUT 1 for the purpose of providing information about the acoustic field to a control system (described below). Monitoring microphones M1-M15 may also be provided for monitoring the acoustic field at specific points of particular interest during operation but are not essential to the operation of this or any other embodiment hereof. Monitoring microphones may be located anywhere in the acoustic test space and need not correspond to control microphone locations.

Referring to FIG. 2, a chart of a typical test specification for a DFAT is shown. As will be familiar to those skilled in the art, the desired spectrum is shown with sound pressure levels for standard one-third octave frequency bands and an OASPL. Those skilled in the art will understand that this is only one method of presenting a test specification. By way of example and not of limitation, test specifications may use broader or narrow frequency bands and may include tolerances for uniformity, specifications for coherence or other specifications relevant to the specific test. Test specifications for DFAT are intended to represent the acoustic environments that the device under test will encounter during actual use. The launch environment is often the most demanding and the test specification will be correlated to a particular launch vehicle. Typical DFAT test spectra span a range of at least five octaves with considerable variation in the sound pressure levels (SPL) for each frequency band. The difference between the SPL of the highest output and lowest output frequency bands is typically greater than 3 db with the maximum SPL requirement typically falling between 100 Hz and 2,000 Hz. By way of example only, the spectrum of the test specification of FIG. 2 spans a range of more than eight octaves with a variation of 14.5 db SPL between the highest output and lowest output frequency bands with the maximum occurring between 100 Hz and 125 Hz. Referring again to FIG. 1, when performing a DFAT it is typically desirable to generate a uniform acoustic field conforming to the test specification throughout the acoustic test volume defined as the volume of air contained within the approximately cylindrical arrangement of the vertical transducer groups T1 through T15 and surrounding the UUT 1. The test specification shown in FIG. 2 has an OASPL of 146.8 db. This OASPL is representative of the highest DFAT levels achieved to date using MIMO control for uniformity and coherence. However, to provide a viable alternative to RATF testing it would be desirable to provide a DFAT system that can achieve higher OASPL's equal to or greater than 149 db OASPL for the desired test specification.

As previously mentioned the achievement of higher OASPL for DFAT requires transducers systems which are fundamentally different from typical commercial loudspeakers. Commercial event sound systems are generally designed for venues with audiences composed of people. Moderate exposure to sound pressure levels greater than 95 db SPL has been shown to inflict permanent hearing damage with the risk of hearing damage rising exponentially at higher SPL levels. As a result commercial sound systems rarely produce sound fields in the listening area that exceed 105 db SPL. Such systems rely on loudspeaker systems designed for smooth frequency response and carefully controlled directivity to provide uniform coverage of the listening area. Good on axis sensitivity rather than overall acoustic sound power output is important in the design of arrays of loudspeakers which can be aimed to evenly project sound to every part of an audience. Intelligibility and subjective sound quality are critically important. For higher sound levels, larger venues or larger audiences the sound system provider simply uses more loudspeakers and more amplifiers.

For reasons that will be discussed below this approach does not work for DFAT systems. Many of the criteria typically used in the design of commercial event sound systems are either not relevant or are undesirable when designing a DFAT system. As previously stated a DFAT system composed of acoustic transducers designed specifically for DFAT has achieved a maximum of 146.8 db OASPL maintained uniformly throughout the acoustic test volume. This OASPL is already much, much higher than any event at which people are present and would likely be fatal to anyone exposed to this level of acoustic energy. Each 10 db increase in OASPL represents a ten-fold increase in the amount of acoustic power required. By way of example, an acoustic field with 149 db OASPL would require approximately 25,000 times the acoustic power of the 105 db OASPL acoustic field typically provided by commercial event sound systems. Although some commercially available loudspeakers are rated to achieve on-axis SPL greater than 140 db their overall total acoustic power output, power handling and reliability are not adequate for DFAT at the highest OASPL's. Since transducers in a DFAT system are arranged so as to retain as much of the acoustic energy produced by the transducers within the acoustic test volume it is the total acoustic power output of the transducers rather than the on-axis sensitivity that is important in the achievement of the required OASPL. For these and other reasons attempts to perform DFAT with commercially available loudspeakers have been limited to a maximum of 145 db OASPL for limited test spectra with poor control of uniformity and coherence and poor reliability.

In addition, unlike commercial event sound systems, in a DFAT system, more speakers cannot simply be added to achieve higher OASPL's. In a cylindrical DFAT system layout such as shown in FIG. 1, a larger number of loudspeakers would mean a larger diameter or taller cylindrical layout thereby increasing the acoustic test volume and the amount of acoustic power required. By way of example, doubling the diameter of the cylindrical layout would allow the use of twice as many loudspeakers but would quadruple the acoustic test volume and quadruple the amount of acoustic power required to achieve the desired OASPL. Therefore, in the design of acoustical transducers for a DFAT system it is necessary to produce as much total acoustic output as possible from the smallest possible transducer radiating surface area.

Since the acoustic transducers of a DFAT system such as shown in FIG. 1 are packed together as tightly as possible around the UUT, in a DFAT system a high proportion of the total acoustic power produced by the acoustic transducers is retained within the acoustic test volume. For this reason and as mentioned previously, the on-axis sensitivity normally quoted in loudspeaker specifications is not as important as the overall electro-acoustic power conversion efficiency of the acoustic transducers and the overall maximum acoustic power output. For the same reasons precise control of directivity is not an important consideration since most of the acoustic power produced by the transducer is retained within the acoustic test volume regardless of the radiation pattern. Also, since real-time closed loop control is used to continuously adjust the spectral output of the system to achieve a predetermined acoustic spectrum, smooth and flat frequency response typically required from commercial event systems is not an important design criterion for DFAT system acoustical transducers. Techniques commonly used to achieve smooth overall frequency response, such as mechanical damping or notch equalization, also reduce the overall average electro-acoustic conversion efficiency and are also undesirable. Additionally, since the spectra for DFAT test specifications are quite far away from being flat, a system of acoustical transducers with a broad flat frequency response would inevitably have either far too little acoustical output capacity in some frequency ranges or far too much in others.

While commercial loudspeakers are typically designed to minimize room interaction and reverberance, a DFAT system must be designed to maximize reverberance. In a DFAT system the maximum OASPL and other important characteristics of the acoustic field depend on the relationship of the reverberant and direct components of the acoustic field. As the name implies, during initial development of the DFAT technique it was believed that the acoustic field developed by a DFAT system would be almost entirely composed of the energy coming directly from the acoustical transducers and that the reverberant component of the field would be minimal. However, measurements have now demonstrated that the acoustic energy of the reverberant component of the acoustic field developed by a DFAT system typically exceeds the acoustic energy of the direct component and dominates the acoustic field characteristics. As will be appreciated by those skilled in the art, this is highly desirable for high intensity acoustic testing of spacecraft as a greater proportion of reverberant energy reduces the input acoustic power required for the achievement of higher OASPL's and produces a more incoherent acoustic field with a greater statistical probability of exciting any mechanical resonances in the UUT.

In a DFAT system, acoustic power produced by the acoustic transducers is partially absorbed and partially reflected as it encounters the boundaries of the acoustic test volume. The reflected portion establishes a reverberant field which is constantly being diminished through absorption at each boundary reflection while, at the same time, being replenished by the acoustic power being supplied directly by the transducers as it is reflected and fed back into the reverberant acoustic field. When the reflected portion of the power being delivered directly by the acoustic transducers equals the acoustic power being lost from the reverberant field an equilibrium is established at a steady state OASPL.

Referring to FIG. 1 the importance of a significant reverberant component to the achievement of high OASPL's can be seen. As described previously the DFAT system of FIG. 1 is comprised of 90 low frequency acoustic transducer systems and 140 mid-high frequency acoustic transducer systems for a total of 230 acoustic transducer systems. This system has achieved 146.8 db OASPL for the test spectrum shown in FIG. 2 using MIMO control of uniformity and coherence. As can be calculated by those skilled in the art, the acoustic energy density required for 146.8 db OASPL is approximately 1.35 watt*second/m³. The approximate dimensions of the DFAT system of FIG. 1 are 7.3 meters in diameter by 7.9 meters high, giving an acoustic test volume equal to the volume of the cylinder 2 defined by the acoustic transducers of approximately 330.6 m³ and, therefore, a total acoustic energy requirement of 446.5 joules.

The acoustic power required from the acoustic transducers to maintain this OASPL can be calculated from the well-known formula for sound in a partially reverberant room;

$$W_s = Dt * c * \frac{S}{4} * \alpha \qquad 1.1$$

Where:

$W_s$=total acoustic power required from the acoustic transducers in acoustic watts $$Dt = \frac{Pa^2}{\rho * c^2} = \text{acoustic energy density in watt} * \text{seconds/meter}^3$$

$c$ = speed of sound in air in meters/second

-continued $S$ = the total surface area of the acoustic test space in meters²

$\bar{\alpha}$ = the average acoustic absorption of the acoustic test space boundaries If we assume the acoustic field is entirely direct with no reverberant component this is equivalent to the loss of 100% of the acoustic power delivered directly by the acoustic transducers through absorption, radiation or other mechanisms or, in mathematical terms, $\bar{\alpha}=1$. From equation 1.1 we can calculate that for the DFAT system of FIG. 1 with $\bar{\alpha}=1$ approximately 31,090 acoustic watts would be required to achieve 146.8 db OASPL throughout this acoustic test volume. If we assume an average electro acoustic conversion efficiency of 1% for the acoustic transducers this would mean a total of more than 3.1 million electrical input watts which far exceeds the actual maximum power handling capacity of this DFAT system.

For the test specification of FIG. 2, the acoustic transducer systems in the DFAT system of FIG. 1 have an actual average spectrum weighted efficiency slightly greater than 1%. Measurements have shown that the system is capable of achieving 146.8 db OASPL for the spectrum of FIG. 2 with approximately 760,000 electrical input watts which corresponds roughly to the maximum power handling capacity of this DFAT system. We can conclude that this would not be possible without a significant reverberant component to the DFAT acoustic field and, therefore, $\bar{\alpha} \ll 1$.

Additional measurements have shown that the reverberant acoustic field in a DFAT system similar to that shown in FIG. 1 is typically dominant and that the ratio of direct to reverberant acoustic energy in a variety of DFAT configurations and locations falls generally in a range of between 1 to 5 and 1 to 2. This ratio is influenced by such factors as the height to diameter ratio of the DFAT system, the acoustic test volume, the size and reverberance of the surrounding acoustic environment and the size and absorptive characteristics of the UUT. As can also be calculated, this range of direct to reverberant ratios corresponds to average absorption of DFAT system configurations of between $\bar{\alpha}=0.18$ to $\bar{\alpha}=0.26$.

The achievement of higher OASPL's of course requires more acoustic power. Using the methods described above we can calculate that for the DFAT system shown in FIG. 1 to reach an OASPL of 146.8 db and $\bar{\alpha}=0.26$ will require more than 8,000 acoustic watts. The achievement of 149 db OASPL will require more than 13,500 acoustical watts. Using the same acoustic transducer systems as previously discussed for the DFAT system of FIG. 1 would require a total of more than 1,300,000 electrical input watts which would represent a roughly 70% increase in the maximum power handling capacity of this DFAT system.

Figure 3:
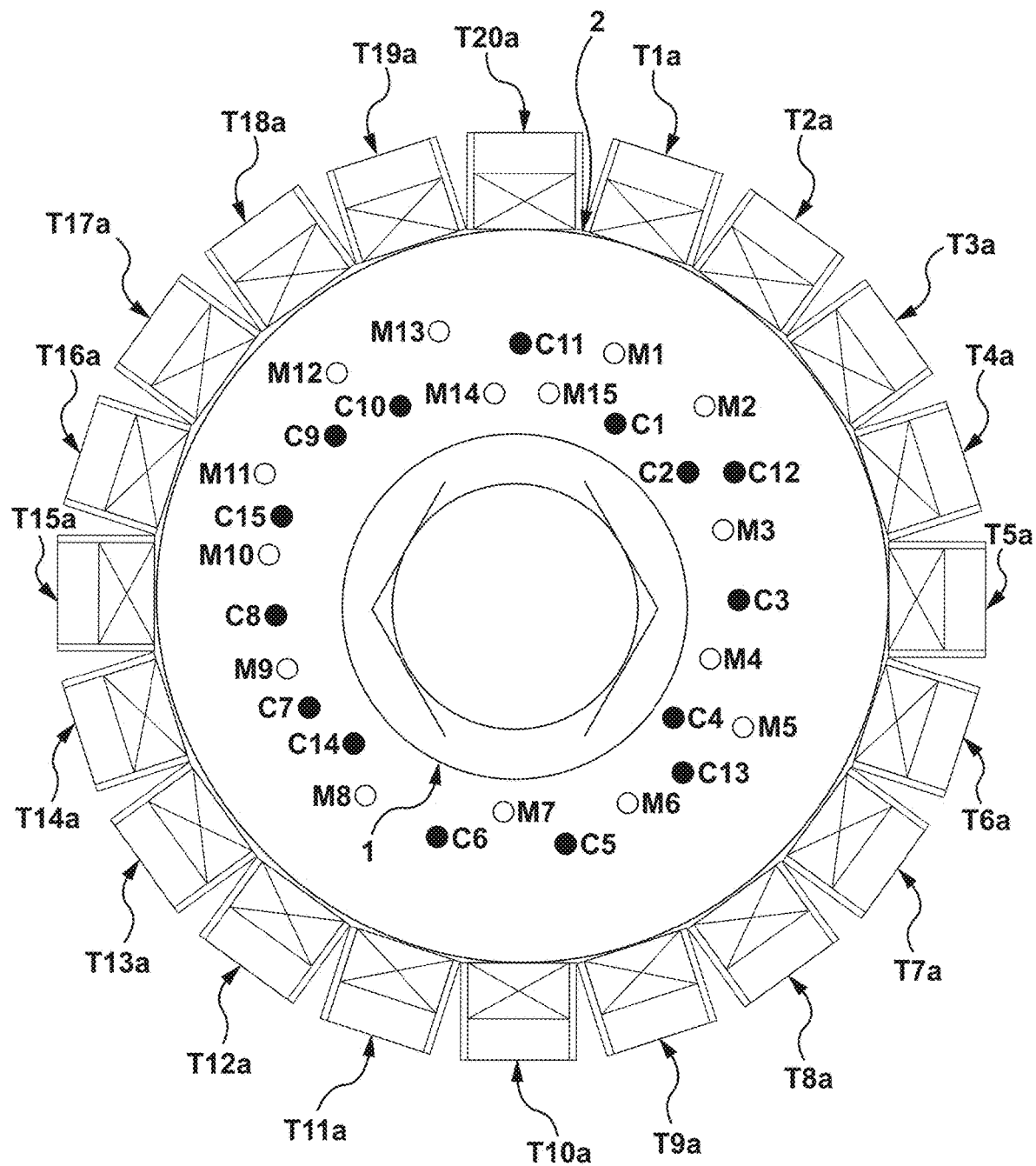
FIG. 3 shows a plan view of a DFAT system utilizing transducers which are all the same, with the transducers in a circular configuration.

As previously discussed, more acoustic transducers cannot simply be added without increasing the acoustic test volume, thereby also increasing the acoustic power required. Those skilled in the art will also recognize that such a large increase in power handling capacity is not trivial without accepting other compromises contrary to the achievement of test goals. Therefore, in considering the characteristics of acoustic transducer systems suitable for DFAT at 149 db OASPL or higher it is useful to think in terms of the average acoustic power density. "Average acoustic power density" as used herein is the total acoustic power output per unit surface radiating area of the acoustic transducer systems required for the achievement of a particular OASPL. This is the total acoustic power required for a given OASPL in a particular DFAT configuration divided by the total active radiating surface area of all of the acoustic transducers in the DFAT system. The "total active radiating surface area of all the acoustic transducers in the DFAT system" is the sum of all the projected planar frontal areas of the individual active acoustic transducers or loudspeaker systems facing into the acoustic test volume. For each individual active acoustic transducer or loudspeaker system, the active radiating surface area or transducer radiating surface area is the projected planar frontal area of the individual acoustic transducer or loudspeaker system facing into the acoustic test volume containing the drive units. By way of example and not of limitation and referring to FIG. 3, which shows a DFAT system with acoustic transducers which are all the same and in a circular arrangement, each acoustic transducer contains a low-frequency section, a mid-frequency section and a high-frequency section. The total active radiating surface area for all of the acoustic transducers in the DFAT system of FIG. 3 is the projected planar frontal area of each individual acoustic transducer or loudspeaker system containing all of the sections and facing into the acoustic test volume. As will be described in detail below, the active radiating surface area for each of the acoustic transducers of the DFAT system of FIG. 3, each containing a low-frequency, mid-frequency and high-frequency section, is approximately 1.296 square meters. The total active radiating surface area for all of the active acoustic transducers is, therefore, the active radiating surface area for each of the aforementioned individual acoustic transducers multiplied by the total number of such acoustic transducers or loudspeaker systems in the DFAT system, as will also be described in detail below. If the DFAT system is composed of separate acoustic transducers or loudspeaker systems for different frequency ranges, as is the case for the DFAT system of FIG. 6, the total active radiating surface area for the system would be the sum of all the projected planar frontal areas of all the acoustic transducers or loudspeaker systems facing into the acoustic test volume.

Acoustic power density will now be as it relates to the total active radiating surface area described above.

$$APD_{OASPL} = Dt * c * \frac{S}{4} * \alpha * \frac{1}{S_T} \quad 1.2$$

Where $APD_{OASPL}$ is the acoustic power density required for the DFAT configuration in acoustic watts per meters of total active radiating surface area to achieve the given OASPL and $S_T$ is the total active radiating surface area of all the acoustic transducers in the DFAT system expressed in meters. For purposes of clarity the Acoustic Power Density APD will always be expressed in terms of acoustic watts per square meter of total active radiating surface area of the DFAT system, $$\frac{Awatts}{S_Tm^2}.$$

By way of example and not of limitation the DFAT configuration shown in FIG. 1, with $\bar{\alpha}=0.23$ will require $APD_{146.8} \cong 39.5$ Awatts/$S_T m^2$ for the achievement of 146.8 db OASPL for the test specification of FIG. 2. This represents the highest level of Acoustic Power Density, APD, previously achieved by any previous DFAT system. Under the same conditions, to achieve 149 db OASPL will require $APD_{149} \cong 67.2$ Awatts/$S_T m^2$. Thus, for a DFAT system to achieve higher acoustic test levels, the acoustic transducers must be specifically engineered to deliver maximum total acoustic output for minimum projected planar frontal area of the active acoustic transducers.

As can be seen from equation 1.2, the required Acoustic Power Density is dependent on the average absorption $\bar{\alpha}$ which can be determined by measuring the reverberation time or RT60 of the DFAT system configuration and calculated from the formula:

$$\alpha = 1 - 10 \exp\left[\frac{-\Delta SPL * V}{2.4955 * c * S}\right] \quad 1.3$$

Where:
  $\Delta SPL$ is the change in db per second from the reverberation time measurement c=speed of sound in air in meters/second
  And for a cylindrical DFT configuration such as in FIG. 1 with inside radius, r, and height, h.:

$$V=\pi r^2 * h$$

is the acoustic test space volume in meters$^3$
where r is the inside radius of the DFAT circle and h is the height, in meters $$S=2 \pi r * h + 2 \pi r^2$$

the total surface area of the acoustic test space in meters$^2$
  $\bar{\alpha}$=the average acoustic absorption of the acoustic test space boundaries As previously stated, the range of average absorption values for DFAT configurations has been determined to be between $\bar{\alpha}=0.18$ to $\bar{\alpha}=0.26$ for cylindrical arrangements of closely spaced acoustic transducers with inside diameters between 2.0 meters and 10.0 meters and for a cylinder height between 70% and 160% of the inside diameter, located in a variety of locations from large live rooms with long reverberation times to semi-anechoic outdoor locations. Based on this range of values for a and for DFAT system configurations between 2 meters and 10 meters in inside diameter and height between 70% and 160% of the inside diameter, the minimum required acoustic power density to reach 149 db OASPL has been determined to be approximately $APD_{149} \cong 46$ Awatts/$S_T m^2$ over the total radiating surface area of the all the acoustical transducers in the DFAT system with a maximum of $APD_{149} \cong 87$ Awatts/$S_T m^2$ for higher values of a and lower DFAT system height relative to diameter. However, for a constant value of average absorption, $\bar{\alpha}$, and DFAT system height approximately equal to the inside diameter, the acoustic power density required for a given OASPL, $APD_{OASPL}$, is relatively constant. By way of example and not of limitation, for a DFAT system with an acoustic test space 2.5 meters in diameter, 2.5 meters in height and with $\bar{\alpha}=0.26$, the required acoustic power density for 149 db OASPL is $APD_{149} \cong 76$ Awatts/$S_T m^2$. For a 7.7 meter diameter by 7.5 meter high DFAT system and with $\bar{\alpha}=0.26$ as shown in FIG. 3, the acoustic power density required for 149 db OASPL is $APD_{149} \cong 76.7$ Awatts/$S_T m^2$. Therefore, in accordance with the present invention the achievement of OASPL levels of 149 db or higher in a DFAT system within the size limits discussed above will require a minimum of $APD_{149} \cong 46$ Awatts/$S_T m^2$. This compares to a maximum of $APD_{146.8} \cong 39.5$ Awatts/$S_T m^2$ achieved by previous DFAT systems. As is known to those skilled in the art, DFAT is performed according to a test specification, such as is shown in FIG. 2, which includes at least an acoustic spectrum with SPL levels for each frequency band and an OASPL. As will be discussed further in the detailed description of the embodiments, the characteristics of the spectrum and SPL levels for each band have a significant impact on the requirements for the acoustical transducers in the DFAT system but the overall Acoustic Power Density required depends only on the OASPL of the test specification.

For DFAT applications, specially designed electrodynamic acoustic transducer-based systems have proved to be the most flexible, reliable and practical for these systems which are typically transported to and assembled at the spacecraft manufacturing site. However, as previously discussed, the maximum OASPL level achieved so far has been 146.8 db OASPL for a typical test specification using MIMO control for both spectral uniformity and coherence. To reach 149 db OASPL would require an increase in acoustic power of approximately 66% from the acoustic transducers without any increase in the transducer radiating surface area.

Figure 4:
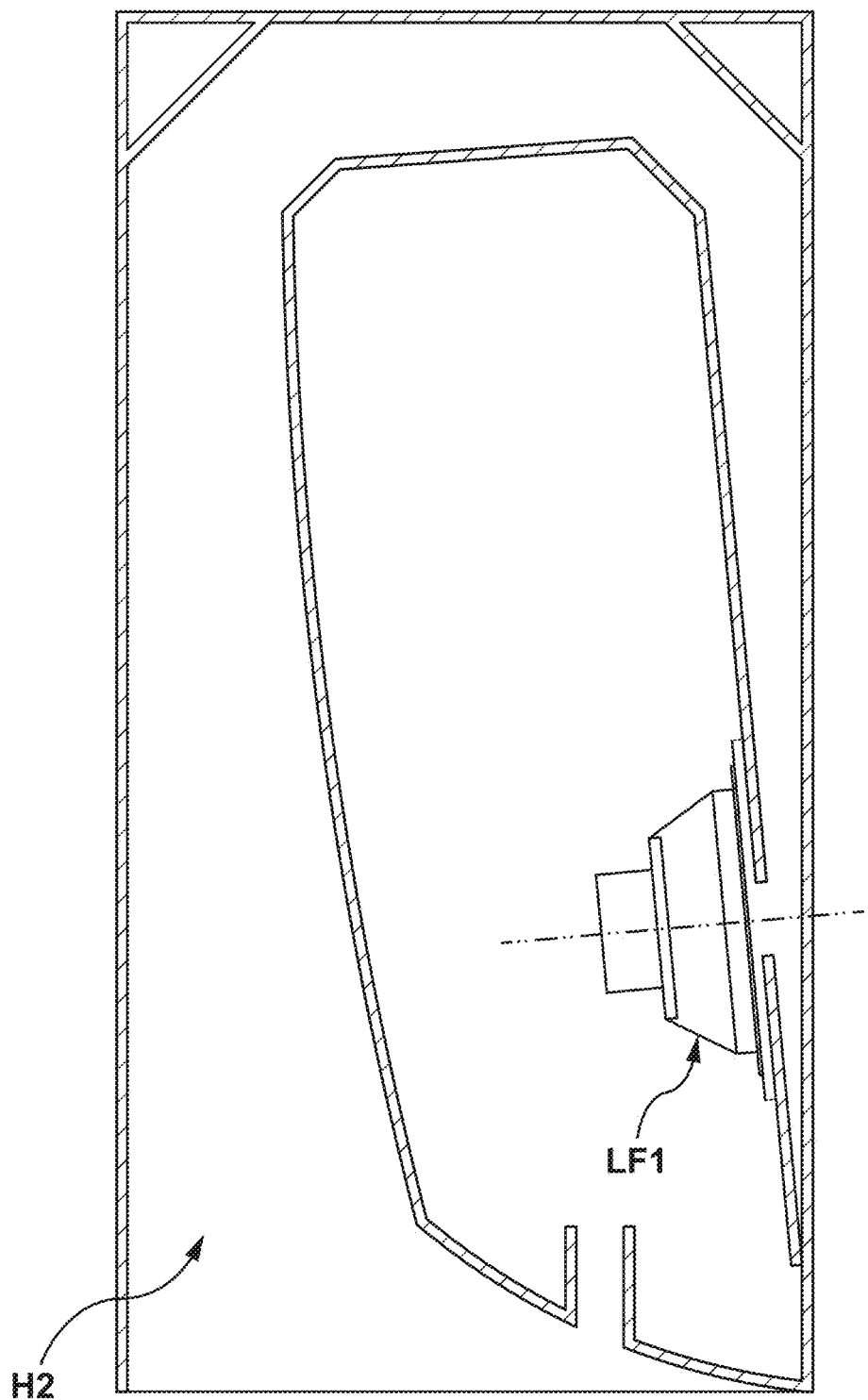
FIG. 4 shows a plan view of a woofer section of a loudspeaker in accordance with the present invention.
Figure 5:
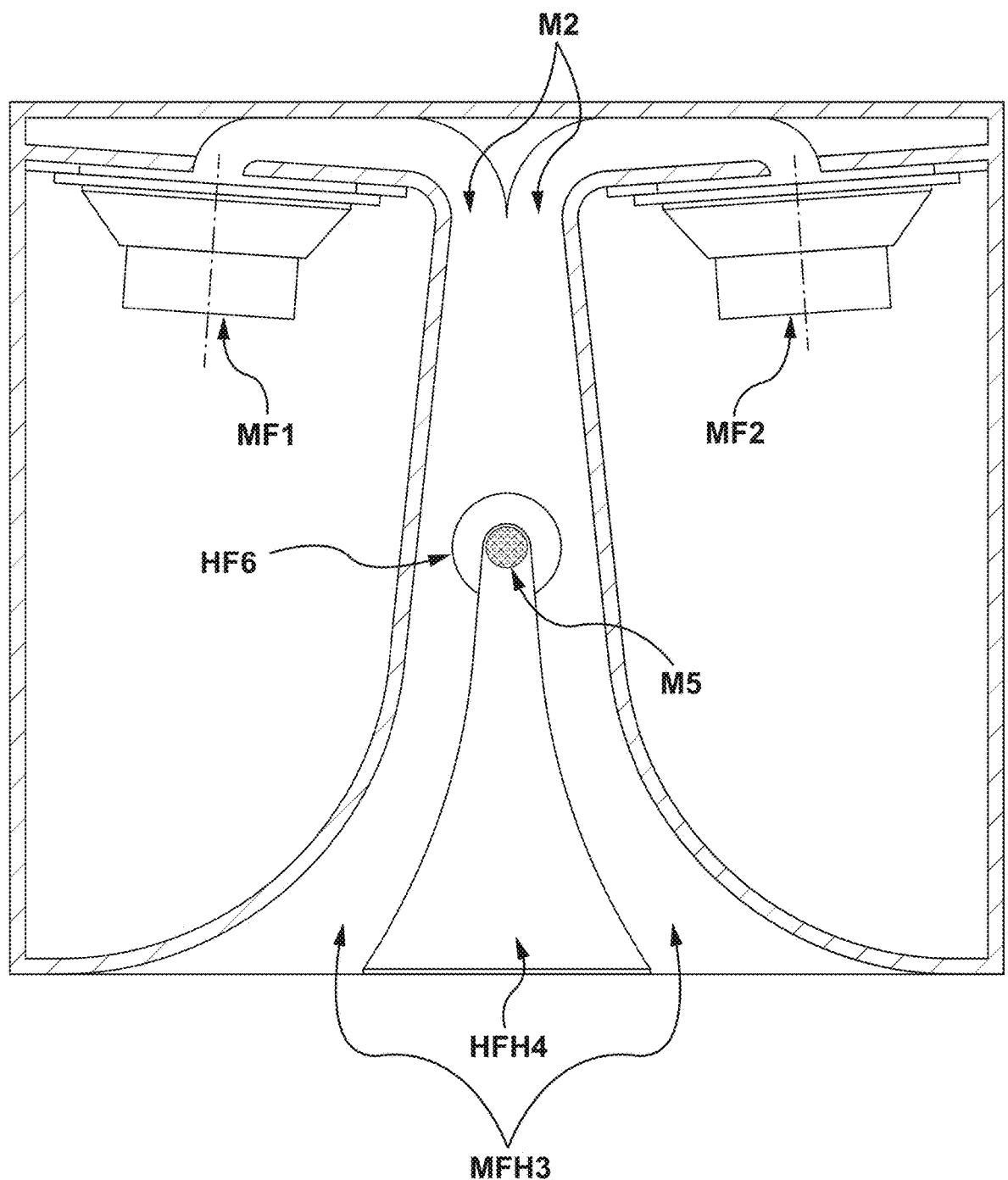
FIG. 5 shows a plan view of a mid-high frequency section of a loudspeaker system in accordance with the present invention.

First Example: In accordance with an embodiment of the present invention and referring to FIG. 3, a DFAT configuration is shown with an inside diameter of approximately 7.7 meters. The acoustic transducer arrays or groups labeled T1a through T20a are each vertical stacks composed of seven identical full-range acoustic transducer/loudspeaker systems, with each stack being approximately 1.2 meters wide and 7.5 meters tall overall. Each of the seven acoustic transducer systems in each stack, T1a through T20a, includes: a low frequency section operating generally from 20 Hz to 143 Hz, a mid-range section operating generally from 143 Hz to 707 Hz and a high frequency section operating generally from 707 Hz to 10 kHz. Referring to FIG. 4 and FIG. 5, plan views are shown of the low-frequency, mid-frequency and high-frequency sections of an acoustic transducer system in accordance with this embodiment of the present invention. As shown in FIG. 4, an electrodynamic drive unit LF1 with a nominal diameter of 21 inches is coupled to a low frequency horn H2 approximately 4.4 meters in length with a mouth area of approximately 0.75 m$^2$. FIG. 5 shows the combined mid-frequency and high frequency sections of the acoustic transducer systems of the DFAT system of FIG. 3. Two electrodynamic drive units with a nominal diameter of 15 inches, MF1 and MF2 are coupled through a manifold system M2 to a mid-frequency horn MFH3 approximately 1.35 meters in overall length with a mouth area of approximately 0.38 m$^2$. Also shown in FIG. 5 are two High-frequency compression drivers HF6 mounted vertically to a manifold M5 and coupled to a high frequency horn HFH4 approximately 0.6 meters in length with a mouth area of approximately 0.18 m$^2$. The total projected planar frontal radiating surface area of all three sections combined is approximately 1.296 m$^2$. Thus, the total active radiating surface area for all of the acoustic transducers in the example of FIG. 3 is 1.296 m$^2$*7 (acoustic transducers per stack)*20 (stacked)=181.4 m$^2$.

In accordance with this embodiment of the present invention, each of the three loudspeaker sections must be designed to maximize the overall acoustic power output per square meter of projected planar frontal radiating surface area to achieve the Acoustic Power Density required for OASPL above 149 db with a typical DFAT test specification spectrum. As a result of this and other previously mentioned considerations, loudspeaker designs to achieve the present invention combine many unusual characteristics. By way of example and not of limitation, the radiating area of the horn mouth of loudspeakers designed in accordance with the present invention is relatively small as compared to the horn length and the total diaphragm area of the drive units attached to the horns. The motor strength relative to moving mass for the drive units is also unusually high. For the loudspeaker systems shown in FIGS. 4 and 5, the 21 inch and 15 inch drive units have a ratio describing reference efficiency from which a range of suitable drive unit design parameters can be calculated:

$$\frac{BL*Sd}{Mms*Re} \geq 8.0$$

Thus, in embodiments hereof, the combination of these design features in relation to the test specification enables the acoustic transducer or loudspeakers described herein to achieve DFAT at higher OASPL levels.

Figure 4A:
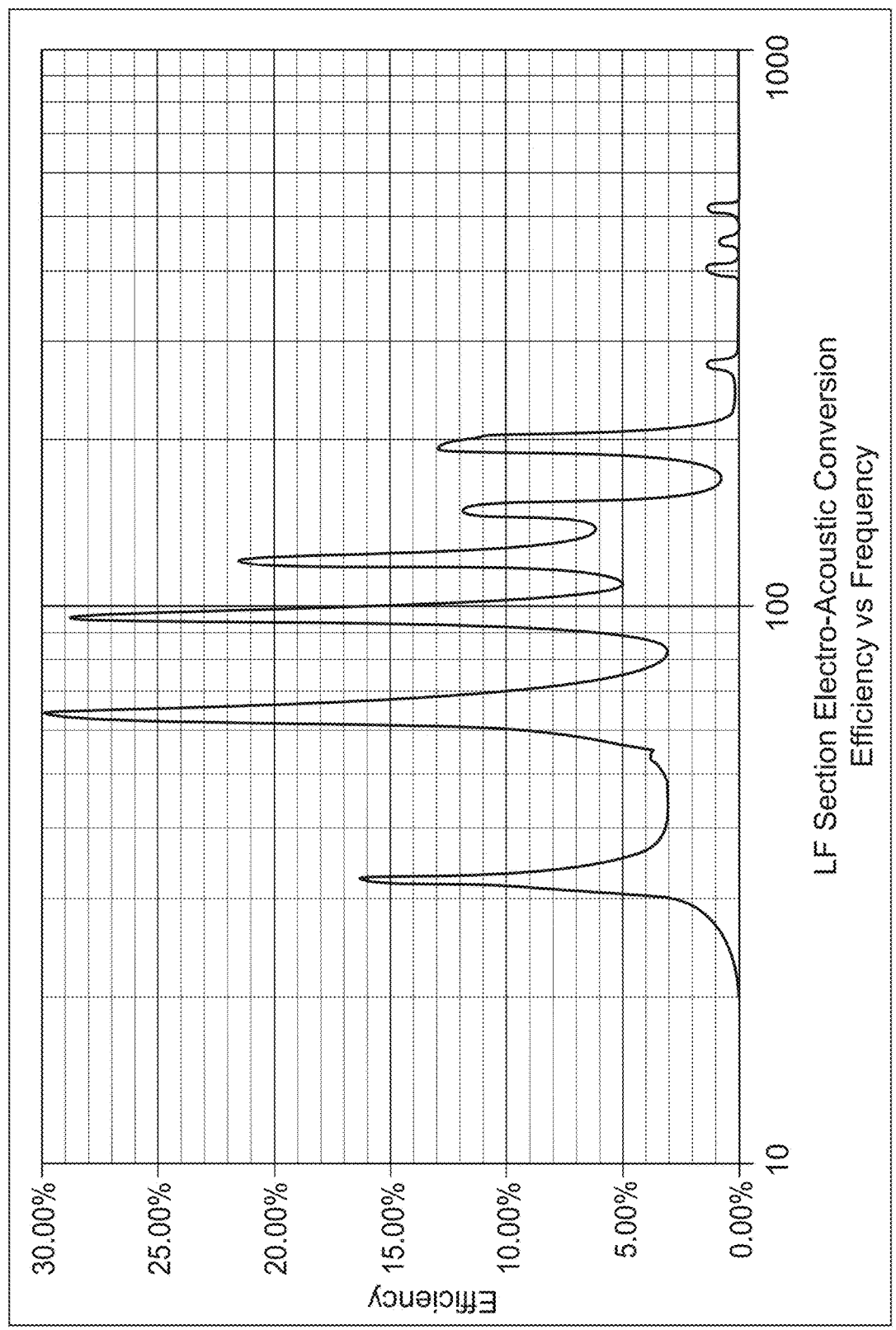
FIG. 4a shows the electro-acoustic conversions efficiency of the loudspeaker system of FIG. 4.
Figure 5A:
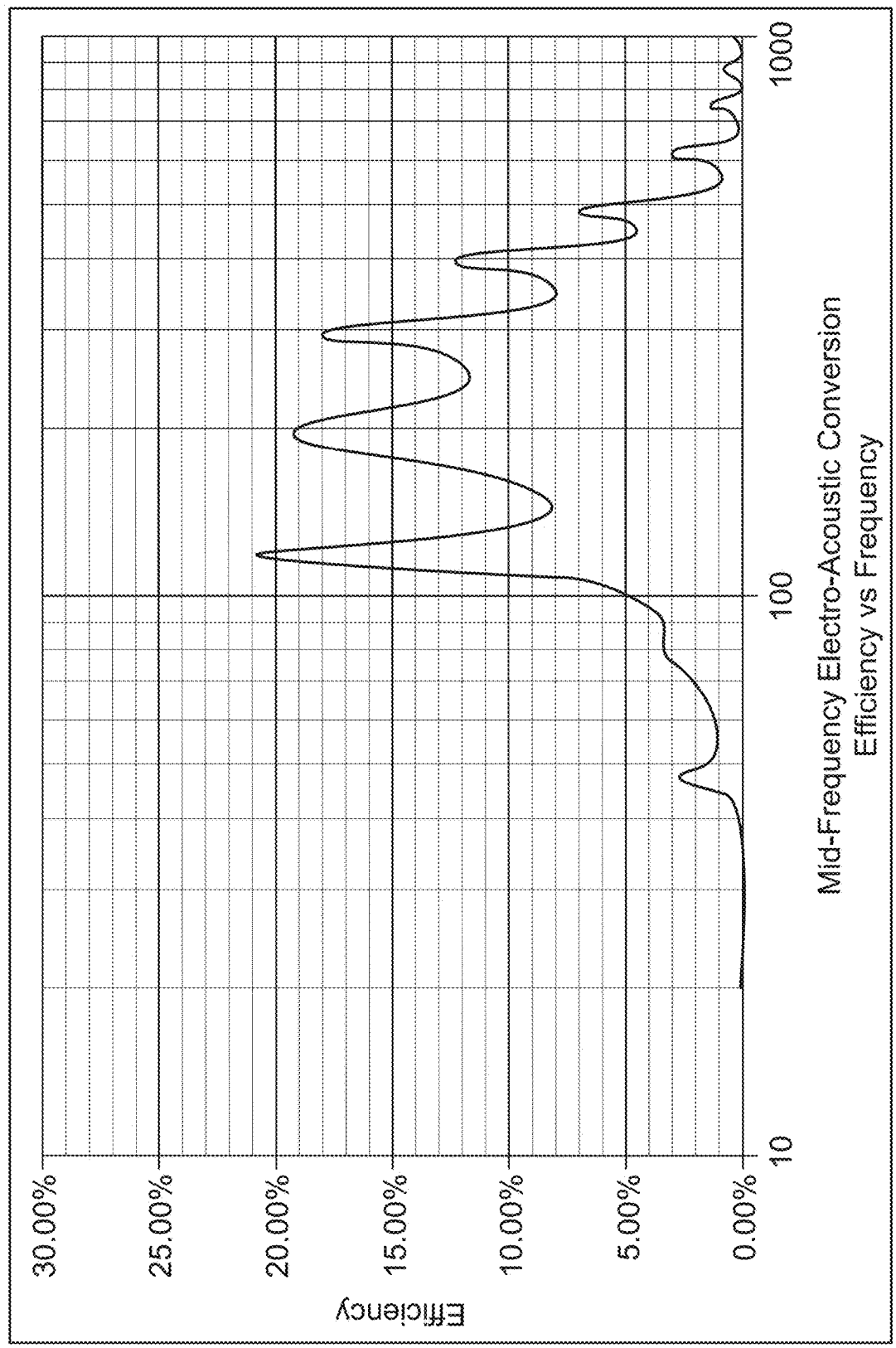
FIG. 5a shows the electro-acoustic conversions efficiency of the loudspeaker system of FIG. 5.

FIG. 4a shows the electro-acoustic conversion efficiency vs. frequency of the low-frequency section shown in FIG. 4 in terms of the percentage of the electrical input power converted to acoustic output power. FIG. 5a shows the electro-acoustic conversion efficiency vs. frequency of the mid-frequency section shown in FIG. 5 in terms of the percentage of the electrical input power converted to acoustic output power. The High-Frequency Drivers HF6 of FIG. 5 have a reference efficiency of greater than 10% and, in combination with the high-frequency horn HFH3, are estimated to have an average electroacoustic conversion efficiency greater than 12% from 500 Hz to 10 kHz.

Referring to FIG. 2a, a higher level test specification is shown which has the same spectrum shape as the 146.8 db OASPL test specification of FIG. 2 that has been achieved by previous DFAT systems, but which has been increased in level to 149 db OASPL. To determine whether the DFAT system shown in FIG. 3 and described above is capable of achieving the test specification shown in FIG. 2a, it is necessary to compare the acoustic power required for the test specification to the maximum acoustic power available from the acoustic transducers in the DFAT system. Those skilled in the art will understand that there are many methods of approaching this problem all of which fall within the scope of the present invention. Using the DFAT system dimensions, average absorption and other parameters previously discussed, Equation 1.1 can be used to calculate the acoustic power required in each frequency band to achieve the acoustic levels specified of desired test specification. Then, using the average electro-acoustic conversion efficiency in each frequency band of the transducers of the DFAT system the total electrical input power required to achieve the test specification can be calculated. If the required electrical input power is within the power handling capability of the acoustic transducers, the DFAT system will be able to achieve the desired test specification and OASPL. However, as discussed above, in this example of the present invention, the acoustic transducer groups utilize loudspeaker systems each incorporating three different sections covering different frequency ranges and having different power handling and efficiency characteristics. As a result, it is necessary to compare the test specification requirements to the maximum output capability of each section separately for the specific operating frequency range of that section.

Referring to FIG. 2a, the SPL levels for each $\frac{1}{3}^{rd}$ octave band of the test specification can be converted to Pa and the result used to calculate the acoustic energy density required for each $\frac{1}{3}^{rd}$ octave band, $Dt_n$, and also the acoustic power required from the acoustic transducers for each $\frac{1}{3}^{rd}$ octave band, $W_n$. Where n represents each $\frac{1}{3}^{rd}$ octave band of frequencies, fmin to fmax, where fmin and fmax are, respectively, the lowest and highest ⅓ octave frequency bands of the test specification.

$$Pa_n = 2*10^{-5}*10^{\left(\frac{SPL_n}{20}\right)} \qquad 1.4$$
$$Dt_n = Pa_n^2/(\rho*c^2)$$
$$W_n = Dt*c*\frac{S}{4}*\alpha$$

The total acoustic power required from each section of the loudspeaker systems described above for this embodiment can be calculated as the sum of the acoustic power required for each ⅓$^{rd}$ octave band of the test specification falling within the frequency range covered by that section of the loudspeaker system.

$$W_s = \Sigma_n W_n \qquad 1.5$$

Where n=f1 ... f2 with f1 being the lowest ⅓$^{rd}$ octave frequency band of the test specification falling within the range of operation of a particular loudspeaker system section and f2 being the highest ⅓$^{rd}$ octave frequency band of the test specification falling within the range of operation of that loudspeaker system section. The acoustic power density required can then be calculated from equation 1.2.

By way of example and not of limitation, FIG. 5a shows the electro-acoustic conversion efficiency of the mid-frequency section of the loudspeaker systems previously described for the current embodiment in terms and in accordance with the present invention of the acoustic power produced as a percentage of the input electrical power. For each ⅓$^{rd}$ octave frequency band within the operating frequency range of the mid-frequency section, dividing the acoustic power required in each of those bands for the test specification of FIG. 2a by the average electro-acoustic conversion efficiency of the mid-frequency section in that same frequency band gives the electrical input power, $EW_n$, required. Summing all the $EW_n$ over the operating frequency range of the mid-frequency section gives the total electrical input power, $EW_s$, required to achieve this portion of the test specification.

$$EW_n = W_n/eff_n \qquad 1.6$$

where $eff_n$ is the average electro-acoustic conversion efficiency over the n$^{th}$ ⅓$^{rd}$ octave frequency band of the loudspeaker system section reproducing that ⅓$^{rd}$ octave frequency band.

$$EW_s = \Sigma_n EW_n \qquad 1.7$$

In the following analysis, the worst-case average absorption will be used, $\bar{\alpha}=0.26$. Those skilled in the art will understand how to perform this analysis for other values of the average absorption. Accordingly, for the mid-frequency section in accordance with this embodiment and operating from approximately 143 Hz to 707 Hz this calculation yields a requirement of $W_{MF} \cong 5,555$ acoustical watts and $EW_{MF}=182,454$ electrical input watts to achieve this portion of the test specification shown in FIG. 2a. This corresponds to approximately 1,303 electrical input watts for the mid-frequency section of each of the 140 loudspeaker systems of this embodiment which is well below the estimated maximum power handling capacity of 2,800 electrical input watts for this mid-frequency section. In calculating the acoustic power density, the acoustic power radiated by the mid-frequency section is spread over the entire surface area of each loudspeaker system, $S_T=140*1.296$ m$^2$=181.4 m$^2$.

Dividing this into $W_{MF}$ gives the required acoustic power density for the test specification for the mid-frequency section only, $$ADP_{MF} = \frac{5,555}{181.4} = 30.6 \; Awatts/S_T m^2.$$

Similarly, for the low-frequency section in accordance with this embodiment and operating from approximately 20 Hz to 143 Hz, this calculation yields a requirement of $W_{LF} \cong 7,312$ acoustical watts and $EW_{LF} \cong 100,851$ electrical input watts to achieve this portion of the test specification shown in FIG. 2a. This corresponds to approximately 720 electrical input watts for the low-frequency section of each of the 140 loudspeaker systems of this embodiment, which is well below the estimated maximum power handling capacity of 2,800 electrical input watts for this low-frequency section. For the low-frequency section $S_T=140*1.296$ m$^2$=181.4 m$^2$, the same as for the mid-frequency section. Dividing this into $W_{LF}$ gives the required acoustic power density for the test specification for the low-frequency section only, $$APD_{LF} = \frac{7,312}{181.4} = 40.3 \; Awatts/S_T m^2.$$

For the high-frequency sections in accordance with this embodiment and operating approximately from 707 Hz to 10 kHz, this calculation yields a requirement of just $W_{HF} \cong 1,028$ acoustical watts. As will be understood by those skilled in the art, compression horn drive units such as those used in the high-frequency sections of the loudspeaker systems in accordance with this embodiment typically have significantly higher electro-acoustic conversion efficiencies than the portions of loudspeakers operating at lower frequencies. The electro-acoustic conversion efficiency of these drive units coupled to the high-frequency horn shown in FIG. 5 is estimated to average greater than 12% over the operating range of 707 Hz to 10 kHz. Accordingly, it is estimated that $EW_{HF}=12,160$ electrical input watts to achieve this portion of the test specification shown in FIG. 2. This corresponds to 87 electrical input watts for the high-frequency section of each of the 140 loudspeaker systems of this embodiment which is well below the estimated maximum power handling capacity of 600 electrical input watts for this high-frequency section. The required acoustic power density for the test specification of FIG. 2a for the high-frequency section only, $$APD_{HF} = \frac{1,028}{181.4} = 5.67 \; Awatts/S_T m^2.$$

The power handling requirements to achieve the test specification shown in FIG. 2a are well below the maximum capabilities of each of the loudspeaker sections reproducing each of the frequency ranges. In addition, the total electrical input power required for this test specification for all three sections combined is just 2,110 electrical watts. Compared to the estimated maximum input power handling capacity for all three sections combined of 6,400 electrical input watts, this suggests the DFAT system shown in FIG. 3, FIG. 4 and FIG. 5 and described above in accordance with this embodiment of the present invention has approximately 4.82 db of headroom above the requirements of the test specification of FIG. 2a and, in accordance with the present invention, will easily achieve our goal of 149 db OASPL for this test specification.

The total of the required acoustic power densities from the three sections is $APD_{Total}$=76.6 Awatts/$S_T$m$^2$ which is also well below the maximum capabilities of the loudspeaker system described above for this embodiment and falls in the middle of the range previously determined for the achievement of 149 db OASPL for the range of DFAT system configurations and values for average absorption previously described. Therefore, the loudspeaker systems described herein for this embodiment and in accordance with the present invention will be suitable for the achievement of 149 db OASPL for test specifications having a spectrum of similar shape to that shown in FIG. 2a and for DFAT system configurations ranging from 2.0 meters to 10.0 meters inside diameter and for DFAT system height between 70% and 160% of the inside diameter located in a variety of locations with a variety of acoustic environments.

For this embodiment of the present invention the above example describing a DFAT system composed of identical loudspeaker systems and requiring $APD_{Total}$=76.6 Awatts/$S_T$m$^2$ to reach 149 db OASPL is only one of many ways of achieving the objective of the present invention to perform DFAT at levels of 149 db OASPL or higher. All DFAT systems within the previously discussed configuration limits composed of acoustic transducer systems capable of achieving overall Acoustic Power Densities of at least 46 acoustic watts per square meter of total transducer radiating surface area for the given test specification fall within the scope of this invention.

Those skilled in the art will also understand that in addition to the acoustic transducer system designs disclosed herein other acoustic transducer system designs may also be capable of supplying acoustic power densities of at least 46 acoustic watts per square meter. Included within the scope of the present invention is the deployment of any such acoustic transducer systems in a DFAT system capable of Acoustic Power Density of at least 46 acoustic watts per square meter of total transducer radiating area for the desired test specification.

Figure 6:
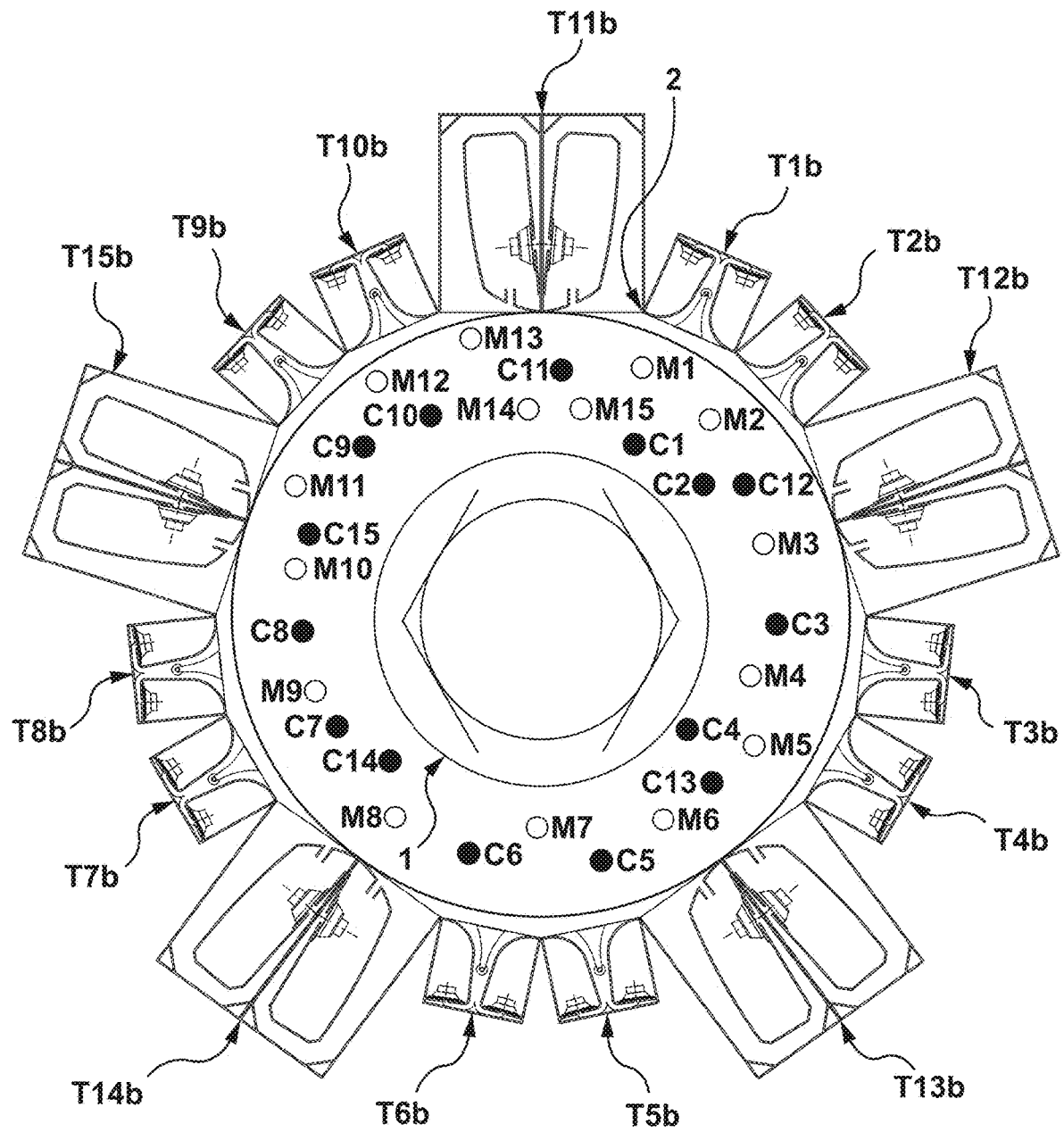
FIG. 6 shows a plan view of a DFAT system utilizing separate acoustical transducers for different frequency ranges.

Second Example: Referring to FIG. 6, another example embodiment in accordance with the present invention is shown wherein the low-frequency sections of the loudspeaker systems are separate from the mid and high frequency sections and arrayed in separate stacks. Acoustic transducer groups T1b through T10b are vertical stacks having sixteen acoustic transducer/loudspeaker systems each with each acoustic transducer containing a mid-frequency section and a high-frequency section, each of which is functionally equivalent to the mid-frequency and high-frequency sections described above with respect to FIG. 5, operating in the same frequency ranges, with the same internal dimensions and arrangement, and with the same drive units as previously described. Each of the sixteen mid-high frequency acoustic transducers of acoustic transducer groups T1b through T10b is approximately 1.2 meters wide by 0.46 meters high and 1.06 meters deep. Each vertical acoustic transducer array T1b through T10b is, therefore, approximately 1.2 meters wide and 7.3 meters tall, overall.

Referring again to FIG. 6, acoustic transducer groups T11b through T15b have two side by side vertical stacks, each individual stack having twelve acoustic transducers/loudspeaker systems, each of which includes only a low-frequency section functionally equivalent to the low frequency section described above with respect to FIG. 6, operating in the same frequency range, with the same internal dimensions and arrangement, and with the same drive unit as previously described. Each of the 24 low-frequency loudspeaker systems of acoustic transducer groups T11b through T15b is approximately 1.2 meters wide by 0.61 meters high and 2.4 meters deep. Each of acoustic transducer groups T11b through T15b is, therefore, approximately 2.4 meters wide and 7.3 meters tall, overall.

For the example embodiment of the present invention described with respect to FIG. 3, it was shown there was approximately 4.82 db of additional headroom above the test specification shown in FIG. 2a based on the estimated maximum power handling of the complete DFAT system. However, this represents an average headroom. To accurately assess the actual headroom available, the headroom available for each section of the loudspeaker systems of the previous embodiment must be determined. For the mid-frequency section of the example embodiment of FIG. 3, it was calculated that the electrical input power required for the frequency range of 143 Hz to 707 Hz of the test specification of FIG. 2a was 1,303 electrical input watts. The estimated maximum power handling capacity is 2,800 watts which gives additional available headroom of 3.32 db for the mid-frequency section of the previous embodiment.

For the low-frequency section we calculated that the electrical input power required for the frequency range of 25 Hz to 143 Hz of the test specification of FIG. 2a was 720 electrical input watts. The estimated maximum power handling capacity is also 2,800 watts which gives additional available headroom of 5.9 db.

Similarly, for the high-frequency section it can be calculated that the electrical input power required for the frequency range of 707 Hz to 10 kHz of the test specification of FIG. 2a reproduced by that section was 87 electrical input watts. The estimated maximum power handling capacity is 600 watts which gives additional available headroom of 8.4 db.

For the test specification of FIG. 2a, the mid-frequency section has the least available headroom at 3.32 db. Therefore the maximum output of the DFAT system shown in FIG. 3 and described in that example will be limited by the maximum output of the mid-frequency section, and the additional capability of the low-frequency and high-frequency sections will not be used. To optimize the maximum capability of the DFAT system it is desirable to use physically separate acoustic transducer systems for different frequency ranges so that different quantities of acoustic transducers in the various frequency ranges can be used accordingly to better match the characteristics of the acoustic transducers to the requirements of a particular test specification.

Referring again to FIG. 6, there are 160 mid-high frequency sections and 120 low-frequency sections. Using the same methodology described above with respect to the first example shown in FIG. 3, using the same frequency ranges of operation for each of the low, mid and high frequency sections, and using the same electro-acoustic conversion efficiencies as previously described, the acoustical power and the electrical input power required for the test specification of FIG. 2a for each of the acoustical transducer sections can be calculated. Due to the difference in height of the DFAT systems shown in FIG. 3 for the first example and in FIG. 6 for the second example, the overall acoustical power and electrical input power requirements are slightly different. Accordingly, for the second example as shown in FIG. 6, the mid-frequency sections will have to produce of $W_{MF} \cong 5,414$ acoustical watts which will require $EW_{MF} \cong 177$, 822 electrical input watts corresponding to 1,111 electrical input watts for each of the 160 mid-frequency sections of the separate mid-high frequency loudspeaker systems. The required acoustic power density for this test specification for the mid-frequency section only is calculated using the total radiating surface area of all the acoustic transducers, $S_T=176.6$ square meters, yielding $$APD_{MF} = \frac{5,414}{176.6} = 30.66 \ Awatts/S_T m^2.$$

Using the same maximum power handling capacity of 2,800 electrical input watts as in the previous embodiment yields available additional headroom of 4.01 db for the mid-frequency section only.

Similarly, for the second example, the low-frequency sections will have to produce of $W_{LF} \cong 7,127$ acoustical watts which will require $EW_{MF} \cong 98,291$ electrical input watts corresponding to 819 electrical input watts for each of the 120 separate low-frequency sections. This yields a required acoustic power density for this test specification for the low-frequency section only and using the total radiating surface area of all the acoustic transducers of $$ADP_{MF} = \frac{7,127}{176.6} = 40.36 \ Awatts/S_T m^2.$$

Using the same maximum power handling capacity of 2,800 electrical input watts as in the previous embodiment yields available additional headroom of 5.3 db for the low-frequency section only.

The high-frequency sections will have to produce of $W_{HF} \cong 1,002$ acoustical watts which will require $EW_{HF} \cong 11,852$ electrical input watts corresponding to 69 electrical input watts for each of the 160 high-frequency sections of the separate mid-high frequency loudspeaker systems. This yields a required acoustic power density for this test specification for the low-frequency section only and using the total radiating surface area of all the acoustic transducers of $$APD_{MF} = \frac{1,002}{176.6} = 5.67 \ Awatts/S_T m^2.$$

Using the same maximum power handling capacity of 600 electrical input watts as in the first example yields available additional headroom of 9.1 db for the high-frequency section only.

Although the maximum output of the mid-frequency section is still the limiting factor on the overall DFAT system output, the separation of mid-high frequency sections from the low-frequency sections has allowed the use of different numbers of sections as compared to the first example shown in FIG. 3 in which all loudspeakers were identical and contained all of the sections covering the entire range of test frequencies. As can be seen from the above calculations, this arrangement of the second example has increased the headroom available from the mid-frequency sections from 3.32 db to 4.01 db and has, therefore, increased the overall maximum OASPL of the DFAT system of the second example shown in FIG. 6 by 0.69 db while using the same acoustic transducers but in different proportions that more closely matches the requirements of the test specification to the output capability of the acoustic transducers. While an improvement of just 0.69 db does not initially seem significant, it is worth noting that for the DFAT system of the first example as shown and described with respect to FIG. 3, increasing the test specification of FIG. 2a from 149 db to 149.66 db OASPL would require more than 50,000 watts of additional electrical input power. Also, since the available headroom from the low-frequency section, now at 5.3 db in this arrangement, is still significantly higher than the mid-frequency available headroom other arrangements, using different numbers of low-frequency sections and mid-high frequency sections may yield further improvement in the overall maximum OASPL of a DFAT system in accordance with this embodiment of the present invention.

It should be apparent from the preceding example that meaningful increases in the maximum OASPL output capability of a DFAT system can be achieved by separating the various sections of the acoustical transducers systems that operate in different frequency ranges so that they can be deployed in appropriate numbers to better optimize the capability of the separate transducer sections for the achievement of a particular test specification. As previously discussed, the spectra of test specifications for DFAT are characterized by variations in the required acoustic output in each of the frequency bands. The difference between the maximum and minimum required acoustic outputs may be as little as 3 db SPL but is often greater as is shown in FIG. 2 and FIG. 2a. The overall shape of the spectrum may also vary with some test spectra requiring relatively greater acoustic output in a particular frequency range according to the acoustic environment of the application. By way of example and not of limitation a test specification requiring more high-frequency energy could be achieved more efficiently and at higher OASPL's by utilizing separate loudspeaker systems for each of the low, mid and high frequency sections and deploying a relatively greater number of high frequency systems. Or, starting with the DFAT system configuration shown in FIG. 6, separate high-frequency loudspeaker sections could be substituted for some of the low-frequency sections to better optimize the DFAT system configuration for a test specification requiring relatively more high frequency energy.

It will also be apparent to those skilled in the art that in addition to the examples given, there are many other methods of optimizing a DFAT system configuration for the achievement of the highest possible OASPL for a given test specification. Many arrangements of separate loudspeaker sections covering differing frequency ranges other than the examples given are possible as are many other different loudspeaker designs. The specific operating frequency ranges of the various loudspeaker sections can also be altered and even overlapped according to the specific electro-acoustic conversion efficiency characteristics of the loudspeaker sections and the requirements of the test specification. However, regardless of the arrangement of loudspeakers for different operating frequency ranges, alterations in the operating frequency ranges of the various loudspeaker sections, specific design characteristics of the acoustical transducer arrays and their components or any other parametric permutations, the previously established minimum total acoustic power density required from the acoustical transducers to achieve 149 db OASPL is 46 acoustical watts per square meter of the total active radiating surface area of all the acoustic transducers in the DFAT system for the given test specification. Therefore, included within the scope of the present invention is the deployment of any arrangement of acoustic transducer systems in a DFAT system capable of Acoustic Power Density of at least 46 acoustical watts per square meter of total active radiating surface area of all the acoustic transducers in the DFAT system for the desired test specification.

Figure 3A:
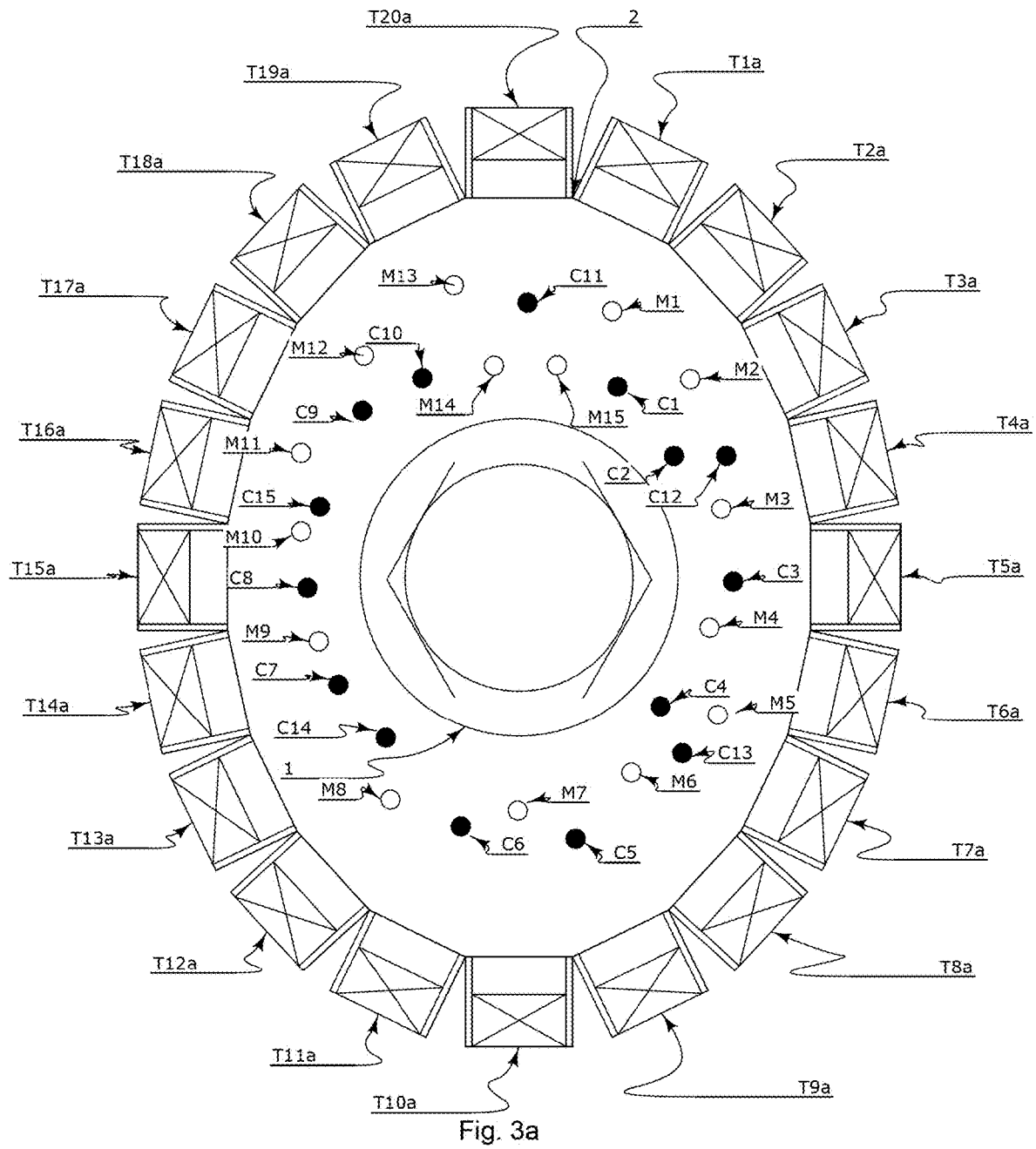
FIG. 3a shows a plan view of a DFAT system with the transducers in an oval arrangement.
Figure 3B:
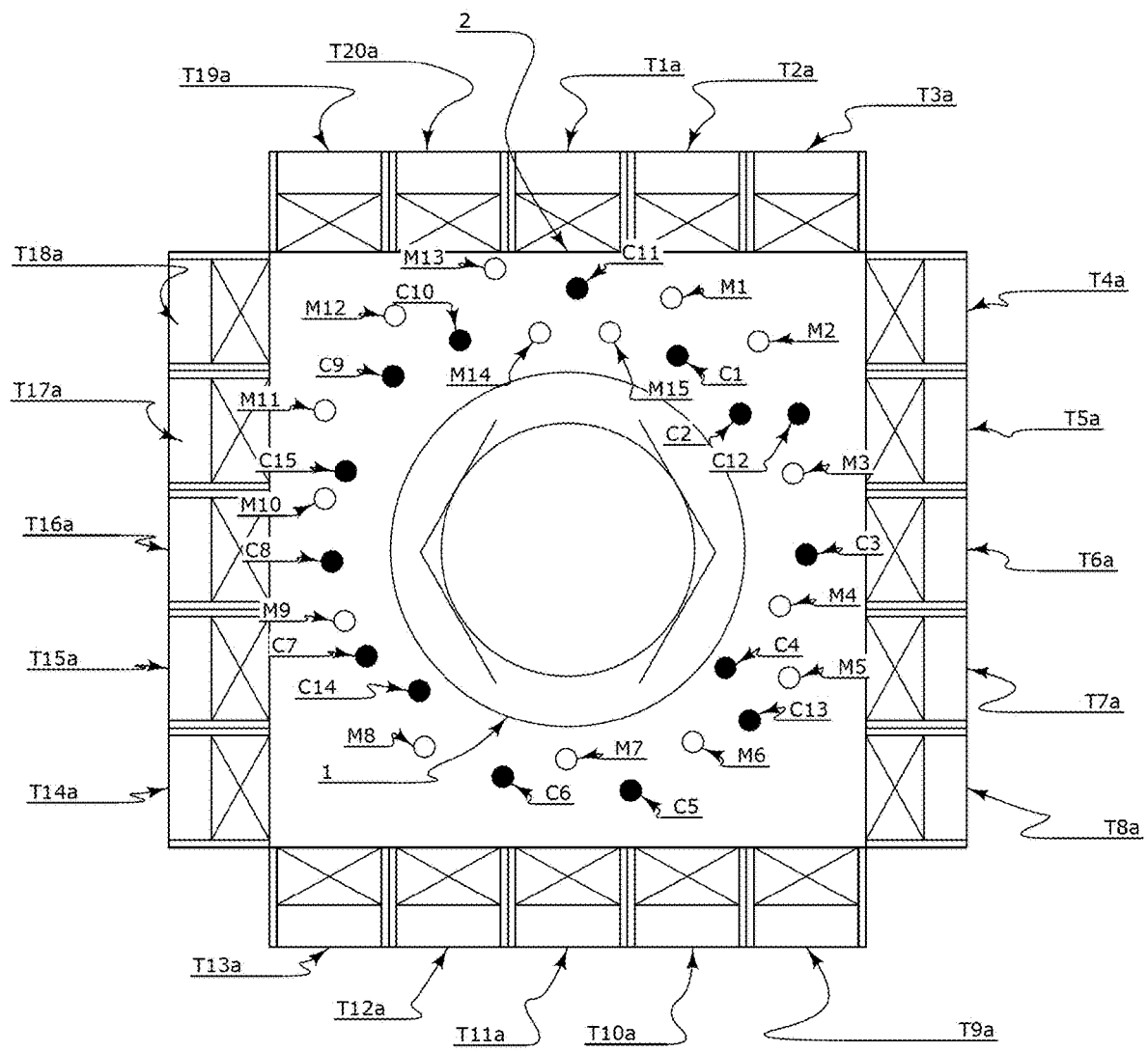
FIG. 3b shows a plan view of a DFAT system with the transducers in a square arrangement.
Figure 3C:
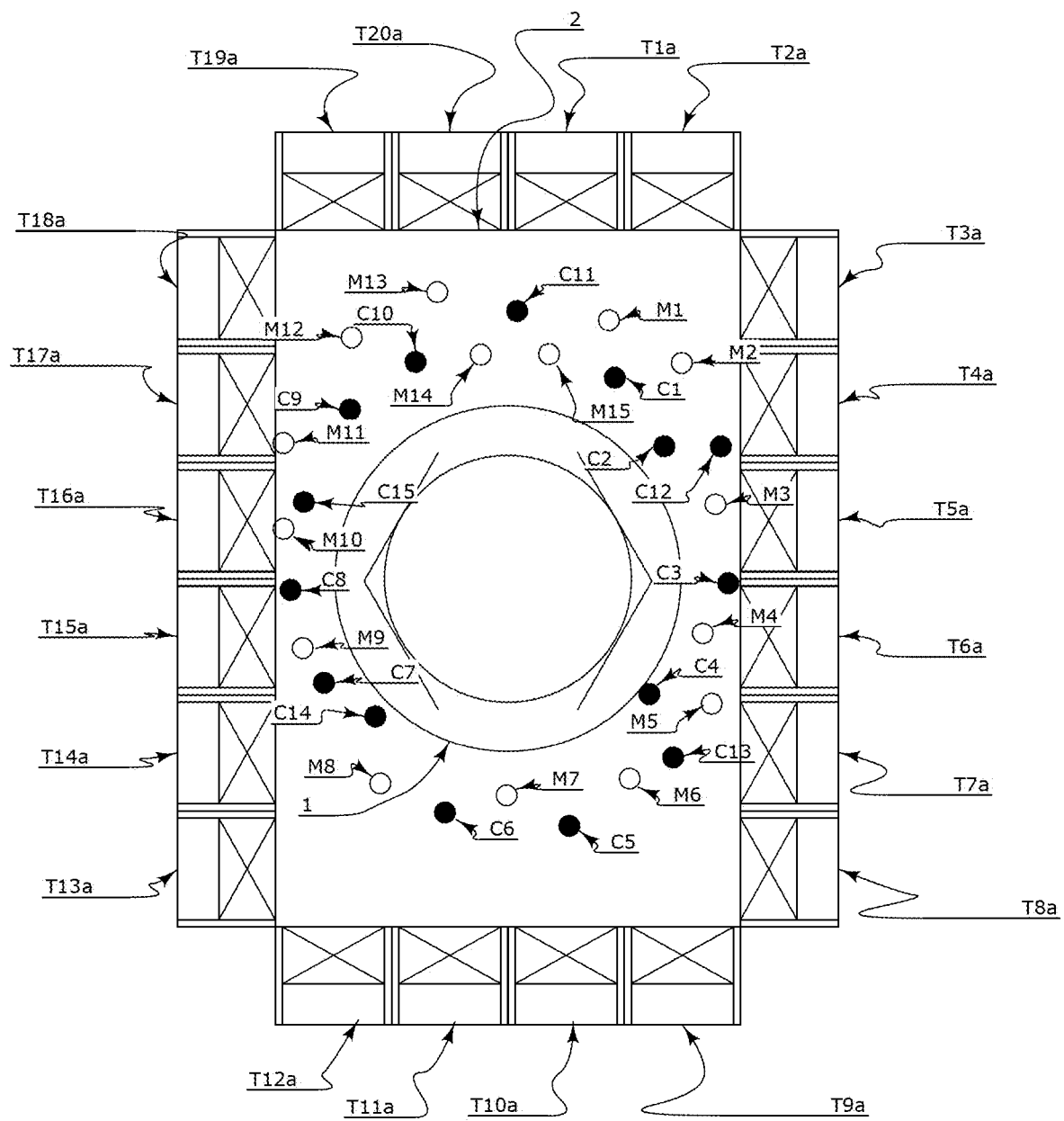
FIG. 3c shows a plan view of a DFAT system with the transducers in a rectangular arrangement.

Further embodiments of the present invention include non-cylindrical DFAT system configurations wherein the acoustic transducers deployed are capable of achieving Acoustic Power Density of at least 46 acoustical watts per square meter of total active radiating surface area of all the acoustic transducers in the DFAT system for the desired test specification. These configurations include ovals (see FIG. 3a), squares (see FIG. 3b), rectangles (see FIG. 3c) and any closed arrangement of transducer stacks where the height 70% and 160% of the diameter of a circle with an equivalent floor area. The suitability of acoustic transducers and optimal configurations for these non-cylindrical arrangements can be analyzed in the same way as described for the previous embodiments.

Additional embodiments include DFAT system configurations that are either not closed or have large gaps between the arrays of acoustical transducers but wherein the acoustical transducers deployed are capable of achieving Acoustic Power Density of at least 46 acoustical watts per square meter of total active radiating surface area of all the acoustic transducers in the DFAT system for the desired test specification. Values for average acoustical absorption for such partially open arrangements will be more dependent on the external environment and may fall outside the range of between $\bar{\alpha}=0.18$ and $\bar{\alpha}=0.26$ previously discussed and should be determined by reverberation time, RT60, measurements. Once that has been accomplished the suitability of acoustic transducers and optimal configurations for these partially open arrangements can be analyzed in the same way as described for the previous embodiments.

We have established that the achievement of 149 db OASPL for a broad range of DFAT system configurations requires a minimum Acoustic Power Density of 46 acoustical watts per square meter of the total active radiating surface area of all the acoustic transducers in the DFAT system. However, there are many conditions which may alter the Acoustic Power Density required to reach an OASPL of 149 db. By way of example and not of limitation, greater height relative to diameter or high aspect ratio non-cylindrical arrangements will reduce the required Acoustic Power Density while higher values of average absorption, MIMO control and additional test specifications such as low coherence, tighter tolerances for spectral uniformity or microphone to microphone variation will increase the required Acoustic Power Density. Regardless of these conditions, included within the scope of the present invention is the deployment of any arrangement of acoustical transducer systems in a DFAT system capable of Acoustic Power Density of at least 46 acoustical watts per square meter of the total active radiating surface area of all the acoustic transducers in the DFAT system for the desired test specification.

Another group of embodiments within the scope of the present invention includes DFAT system configurations capable of the minimum Acoustic Power Density required for 150 db OASPL for a given test specification. Using the same methodology as described previously we can determine that the minimum Acoustic Power Density required for a DFAT system of between 2.0 meters and 10 meters in diameter and with height between 70% and 160% of the inside diameter over the range of average absorbance of between $\bar{\alpha}=0.18$ and $\bar{\alpha}=0.26$ is $APD_{150}=57.9$ Awatts/$S_Tm^2$. For the examples shown in FIG. 3 and FIG. 6, it was previously determined that there was available headroom of 3.32 db and 4.01 db respectively relative to the 149 db OASPL test specification of FIG. 2a. Applying the analysis methodologies described previously, it can be determined that the DFAT system of FIG. 3 is capable of a maximum acoustic power density for the test spectrum of FIG. 2a of $APD_{max}=163.8$ Awatts/$S_Tm^2$ and that the DFAT system of FIG. 6 is capable of a maximum acoustic power density for the test spectrum of FIG. 2a of $APD_{max}=192.6$ Awatts/$S_Tm^2$. Therefore, in accordance with the present invention, both the DFAT system of FIG. 3 and the DFAT system of FIG. 6 can achieve at least the minimum Acoustic Power Density of 57.9 acoustic watts per square meter of the total active radiating surface area of all the acoustic transducers in the DFAT system.

As stated above with respect to the achievement of 149 db OASPL, regardless of the many previously discussed permutations possible in the deployment of a DFAT system the previously established minimum total acoustic power density required from the acoustical transducers to achieve 150 db OASPL is 57.9 acoustical watts per square meter of the total radiating area of all transducers in the system for the previously discussed range of DFAT system configurations and for the given test specification. Therefore, included within the scope of the present invention is the deployment of any arrangement of acoustic transducer systems in a DFAT system capable of Acoustic Power Density of at least 57.9 acoustical watts per square meter of the total active radiating surface area of all the acoustic transducers in the DFAT system for the desired test specification.

Nevertheless, not all tests require OASPL levels of 150 db and many tests are still performed at levels at or below the 146.8 db OASPL achieved by DFAT systems. For such lower level tests, the maximum output capability of the DFAT system described in the previous embodiments is not needed. However, it would be advantageous to be able to perform such lower level tests utilizing a smaller number of the same acoustic transducer systems as required for higher level tests. The costs of constructing a DFAT system for sale or of providing contract DFAT services is primarily determined by the amount of equipment required. Therefore, a DFAT system utilizing a smaller number of higher output acoustic transducers and associated equipment when properly deployed may offer both cost and performance advantages over DFAT systems utilizing a larger number of lower output acoustic transducers and associated equipment. By way of example and not of limitation, the DFAT system shown in FIG. 1 requires 90 low frequency acoustic transducer systems and 140 mid-high frequency acoustic transducer systems to achieve 146.8 db OASPL for the test spectrum of FIG. 2. As previously shown for the DFAT system of FIG. 1 and $\bar{\alpha}=0.23$, the achievement of 146.8 db OASPL for the test specification of FIG. 2 will require $APD_{146} \cong 39.5$ Awatts/$S_Tm^2$. $APD_{149} \cong 67.2$ Awatts/$S_Tm^2$ will be required to achieve 149 db OASPL under the same conditions. $APD_{max} \cong 39.5$ Awatts/$S_Tm^2$ represents the approximate maximum acoustic output capability of the DFAT system of FIG. 1. Therefore, by a simple ratio, a system utilizing acoustic transducers of equivalent size but having a maximum acoustic output capability of $APD_{max} \cong 67.2$ Awatts/$S_Tm^2$ would require less than 60% as many of such higher output acoustic transducers to achieve the same 146.8 db OASPL for the test spectrum of FIG. 2. However, this assumes that the smaller number of acoustic transducers could be deployed in such a way as to effectively enclose the same acoustic test volume while continuing to deliver the same maximum $APD_{max}=67.2$ Awatts/$S_Tm^2$ and allowing good control to match the required test spectrum.

Accordingly, in a further group of embodiments of the present invention, a smaller number of higher output acoustic transducer systems is efficiently deployed for lower level tests by substitution of dummy panels for some of the active acoustic transducers, thereby reducing the number of acoustic transducer systems required to enclose the acoustic test volume while maintaining adequate acoustic output capability and the ability to control the acoustic field in the acoustic test volume to closely match the required test spectrum. As used herein, a "dummy panel" means any semi-reflective acoustic panel occupying what would otherwise be substantially empty space in the perimeter of the acoustic test volume of a DFAT system which does not receive an electronic signal and does not actively produce sound, excluding building elements such as floors, walls or ceilings and the surface of the UUT itself. "Substantially empty space in the perimeter of the acoustic test volume" means portions of the acoustic test volume perimeter which have greater than 50% open area as viewed from the center of the UUT. By way of example and not of limitation a dummy panel may be an inactive semi-reflective acoustic panel that replaces an active acoustic transducer in a group of active acoustic transducers. Or, a dummy panel may be an inactive semi-reflective acoustic extension of the structure of an active acoustic transducer which occupies space but is not an essential part of the active acoustic transducer. A dummy panel may also be a semi-reflective acoustical panel positioned to reduce gaps between active acoustic transducers, gaps between groups of active acoustic transducers, gaps between active acoustic transducers and test site building elements such as walls, floors or ceilings or large open areas such as the top of a DFAT system configuration with an open top.

Figure 7:
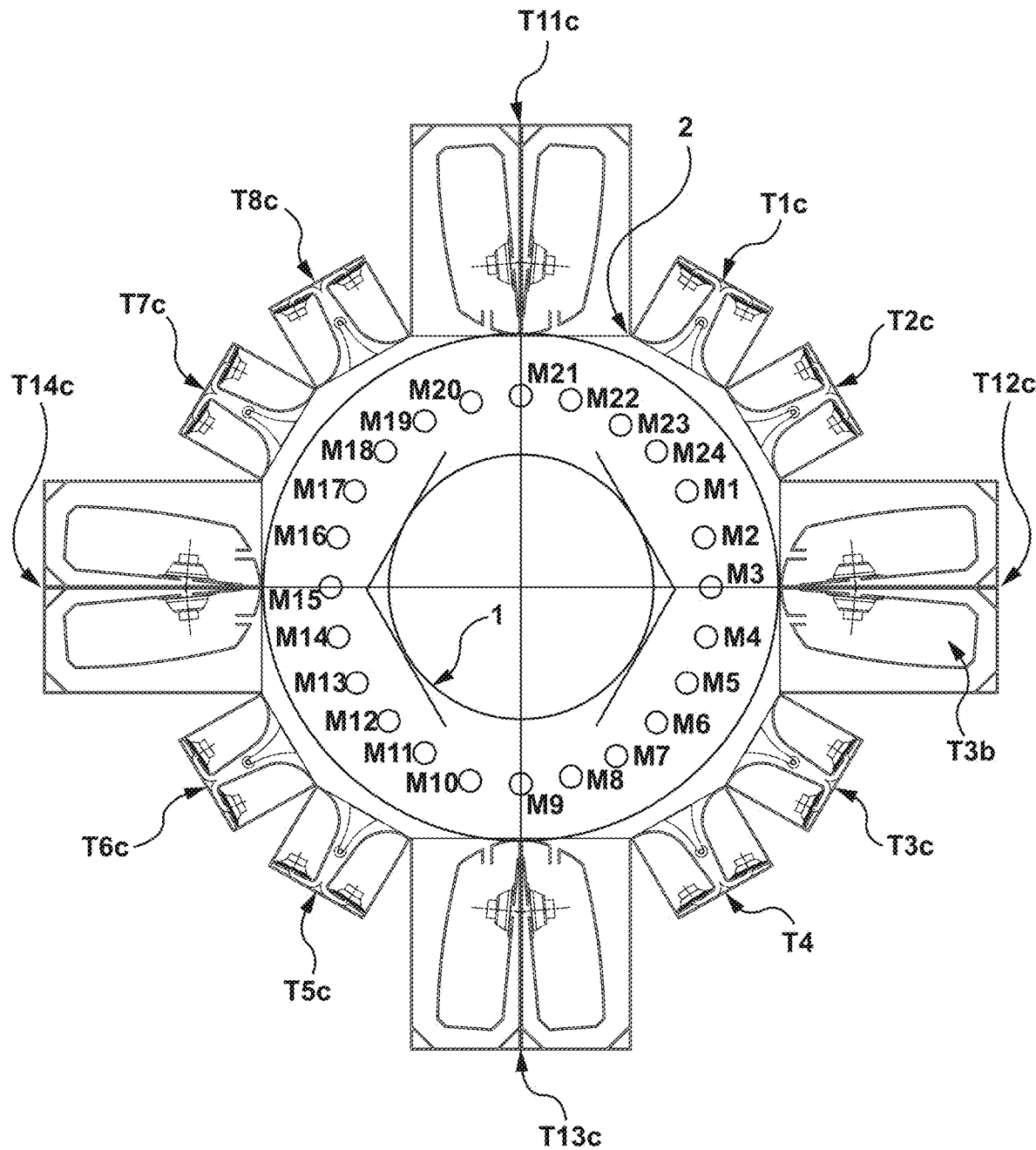
FIG. 7 shows a plan view of a DFAT system according to embodiments herein.
Figure 7A:
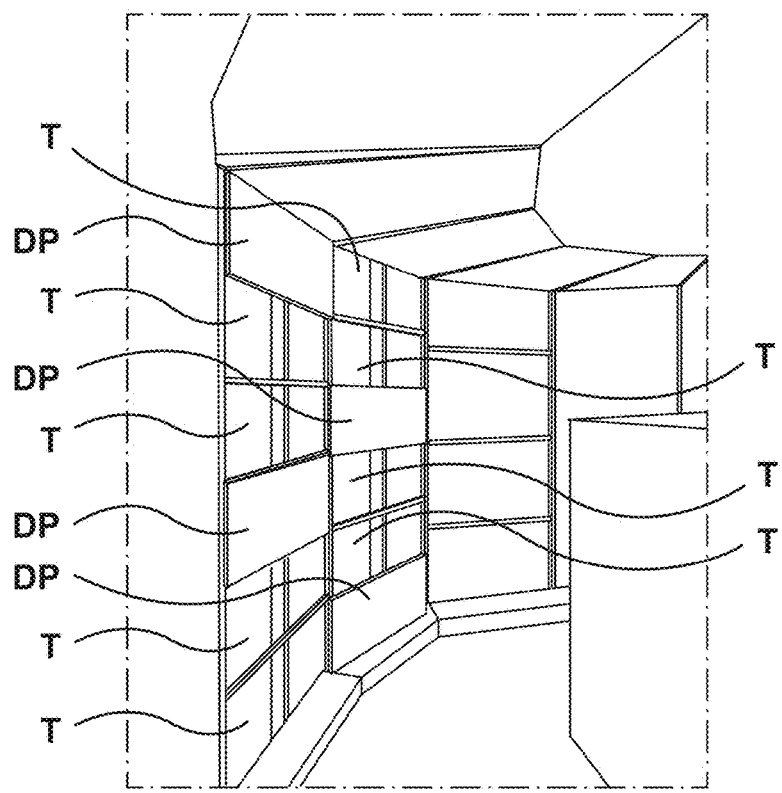
FIG. 7A shows an example of a flat dummy panel.

In an example of this aspect of the present invention, for every group of three active acoustic transducers, one of the active acoustic transducers is replaced with a flat dummy panel having approximately the same shape and face area as a single active acoustic transducer. By "approximately the same shape and face area", it is meant within 10% of the face area and what a person skilled in the art would consider the same shape. Referring to FIG. 7, a DFAT system is shown in accordance with this example. As in the DFAT system of FIG. 6, the DFAT system of FIG. 7 utilizes low frequency acoustic transducers which are separate from the mid and high frequency acoustic transducers, which are arrayed in separate vertical stacks. Acoustic transducer groups T11c through T14c of FIG. 7 each include two side-by-side vertical stacks, with each vertical stack having of four acoustic transducers/loudspeaker systems, each of which is identical to the low frequency sections described above with respect to FIG. 6 and operating in approximately the same frequency range. Acoustic transducer groups T1c through T8c are vertical stacks, with each vertical stack having four active acoustic transducers/loudspeaker systems and two dummy panels. In the embodiment of FIG. 7, each of the four active acoustic transducers/loudspeaker systems is identical to each of the acoustic transducers/loudspeaker systems in the mid-high frequency sections described with respect to FIG. 6. The dummy panels are of approximately the same shape and size as the face of the active mid-high acoustic transducer/loudspeaker sections. As shown in FIG. 7a, in an embodiment, the dummy panels DP may be simple flat panels constructed of ¾" marine plywood and designed to fit the same rigging fixtures that support the active acoustic transducers/loudspeakers T1c through T8c of FIG. 6. However, this is not meant to be limiting, and other materials, thicknesses, and connections may be utilized. As will be recognized by those skilled in the art, such flat panels will require suitable bracing to prevent excess vibration.

Figure 7B:
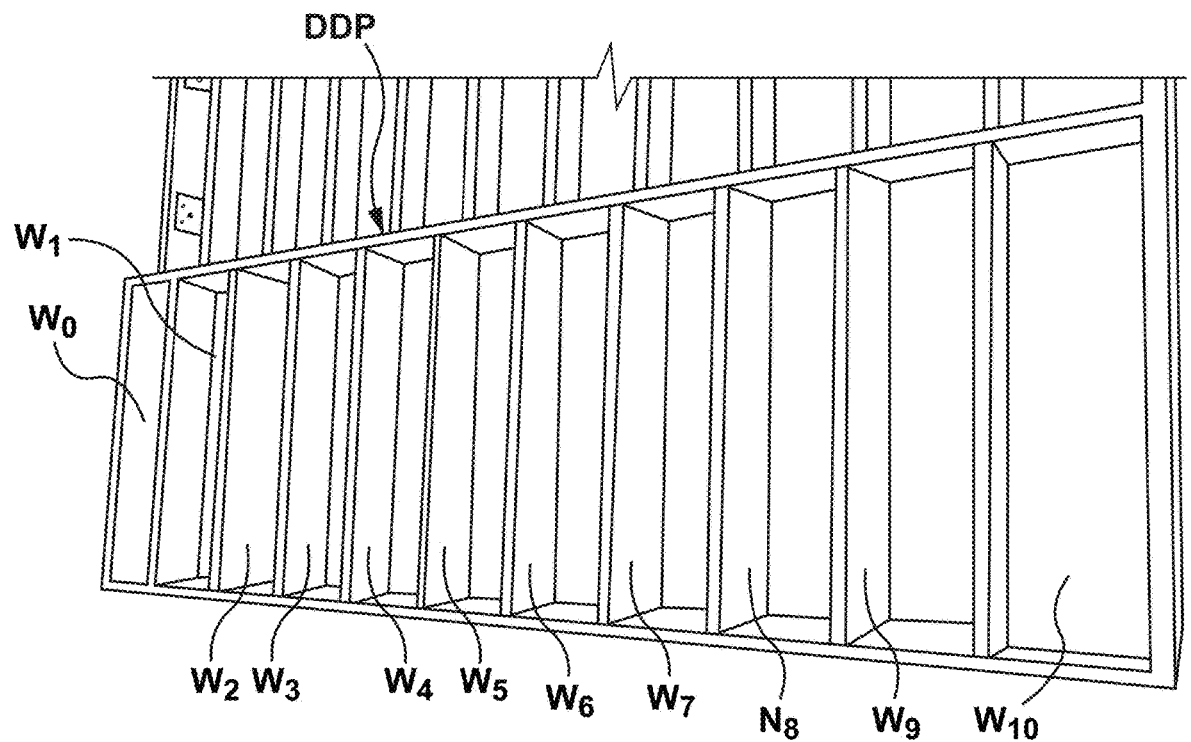
FIG. 7B shows an example of a diffuser dummy panel.

In other embodiments, the dummy panels may be acoustic diffusers. FIG. 7b shows an example of an acoustic diffuser dummy panel DDP used as a dummy panel. The acoustic diffuser panel DDP of FIG. 7b also has approximately the same size and shape as the active acoustic transducers/loudspeakers, is designed to fit the same rigging fixtures, and is deployed in the same manner as the flat dummy panels. In the example diffuser dummy panel of FIG. 7b, as will be understood by those skilled in the art, the diffuser dummy panel DDP is a QRD diffuser having eleven wells with a design frequency of 295 Hz and a period width of 46.32 inches. As can be seen from inspection of FIG. 7b, except for the three shallowest wells; well zero $W_0$, well one $W_1$, and well ten $W_{10}$, the other eight wells $W_2$-$W_9$ are tapered from full height near the front to zero at the back so as to suppress spectral notches at frequencies whose quarter-wavelengths correspond to the maximum depths of the wells.

Referring again to FIG. 7a, in embodiments using dummy panels, whether they are flat dummy panels as in FIG. 7a or diffuser dummy panels as in FIG. 7b, it is desirable to arrange the dummy panels in a checker-board fashion as shown such that dummy panels are not directly adjacent to each other. In the embodiment shown in FIG. 7a, in a particular vertical stack, the dummy panels DP are separated by two active loudspeaker systems. Further, adjacent vertical stacks are arranged such that the dummy panels are staggered with respect to each other. For example, as can be seen in FIG. 7a, the left vertical stack starts with two active loudspeakers, then a dummy panel. Proceeding vertically upward, although not shown, are two active loudspeaker systems and then another dummy panel. The right vertical stack starts with a dummy panel at the bottom, then two active loudspeaker systems, then another dummy panel. Although not shown, the stack continues with two more active loudspeaker systems. Thus, the dummy panels are not adjacent to each other in a vertical stack, nor adjacent dummy panels in adjacent stacks.

In order to evaluate the effectiveness of this approach, the power required for the active loudspeakers in this embodiment is compared to the power that would be required if the vertical stacks were fully populated with active loudspeakers and no dummy panels. In this regard, it is useful to think of this aspect of the present invention as a reduction in the acoustic power density, RAPD, in order to make more effective use of a smaller number of higher output acoustic transducers. In this embodiment, the ratio of dummy panels to active acoustic transducers is 1:2. By adding the dummy panels we have effectively increased the radiating surface area of the active loudspeakers by 50% without changing anything else, thereby reducing their $APD_{max}$ by one-third. Therefore, for this embodiment the RAPD≅0.33. Therefore, when comparing power requirements to a DFAT system fully populated with active acoustic transducers, the power required per active loudspeaker in this embodiment should be no more than 50% greater than the power required per active loudspeaker in the equivalent fully populated DFAT system.

FIG. 9, compares the power requirements of the DFAT system of FIG. 7 fully populated with active loudspeakers to the power requirements for same system configuration with flat dummy panels and to the power requirements for the same system configuration with acoustic diffuser dummy panels deployed as described above for the target spectrum of FIG. 8, wherein the dummy panels are provided in the 1:2 ratio described above. MISO and MIMO rectangular control methods were used, as described in U.S. Pat. Nos. 9,109,972 B2 and 9,683,912 B2, 10,295,434 B2 and U.S. Publication No. 2020/and which will be familiar to those skilled in the art. Referring to FIG. 7, microphones C1 through C24 are used as independent inputs to the control system as described in the patents referenced above and as known to those skilled in the art. For MISO control (Multiple Input Single Output), a single output signal is synthesized by comparing the 24 microphone input signals to the target spectrum and that single signal is output simultaneously to all the active loudspeaker systems after passing through their respective crossovers as also described in the prior art. In this configuration coherence is effectively uncontrolled. The two MIMO control configurations (Multiple Input Multiple Output) utilize rectangular control and a matrix system to control both the high and low frequency ranges for the target spectrum and for coherence. Four independent drive signals, one for each pair of Mid-High frequency stacks are synthesized by comparing the 24 microphone input signals to the target spectrum and target coherence. These four output signals are matrixed as disclosed in U.S. Pat. No. 10,295,434 B2 for the low frequency loudspeaker sections. Results for MIMO with coherence=0.6 and coherence=0 are shown. Coherence is controlled between all microphone pairs. As is well known to those skilled in the art, lower values of coherence indicate a more random field with greater diffusivity that is more likely to excite all resonances in the Unit Under Test.

The upper section of FIG. 9 shows the power required per active loudspeaker system (average real power) for the test specification of FIG. 8. As can be seen, and as expected, the configuration fully populated with active loudspeaker systems (Fully Populated Configuration) requires less power than the configurations with dummy panels (Flat Dummy Panel Configuration and Acoustic Diffuser Dummy Panel Configuration). It is expected that less power per active loudspeaker systems is required because there are more active loudspeaker systems in the Fully Populated Configuration. However, as can be seen, in each of the scenarios presented, the average power required in the dummy panel configurations is less than would be expected given the reduction in number of active loudspeaker systems (average power would be expected to increase by 1.5 with ⅓ fewer active loudspeaker systems). Only the Acoustic Diffuser Dummy Panel Configuration with MIMO drive and 0.6 Coherence is above 1.5 times average power for the corresponding Fully Populated Configuration.

The lower section of FIG. 9 shows the comparison taking into account the fewer number of active loudspeakers by showing the power required for each configuration in db relative to the Fully Populated Configuration utilizing MISO (Multiple Input Single Output) control ("Fully Populated MISO Configuration"). Power required for the dummy panel configurations is adjusted using RAPD=0.33 to allow direct comparison to the Fully Populated MISO configuration, as there are ⅓ fewer active loudspeaker systems. As can be seen, under MISO control, the Flat Dummy Panel Configuration uses 0.8 db less power than the Fully Populated MISO Configuration and the Acoustic Diffuser Dummy Panel Configuration uses 0.9 db less power than the Fully Populated MISO Configuration, after each is adjusted for RAPD=0.33. For MIMO control, the flat Dummy Panel Configuration uses slightly less relative power than the Fully Populated Configuration for coherence=0.6 and much less relative power for coherence=0. The Acoustic Diffuser Dummy Panel Configuration uses significantly more relative power than the Fully Populated Configuration for coherence=0.6 and roughly equal relative power for coherence=0.

FIGS. 10a-10c, 11a-11c, and 12a-12c show the acoustic spectra in the test volume as measured by each of the control microphones at their respective locations for each of the configuration/control combinations shown in FIG. 9 (9 combinations total). The upper and lower bold dark lines represent plus/minus 3 db from the target spectrum while each of the lighter lines is the spectrum measured by one of the control microphones. The center bold line is the target spectrum.

Figure 10A:
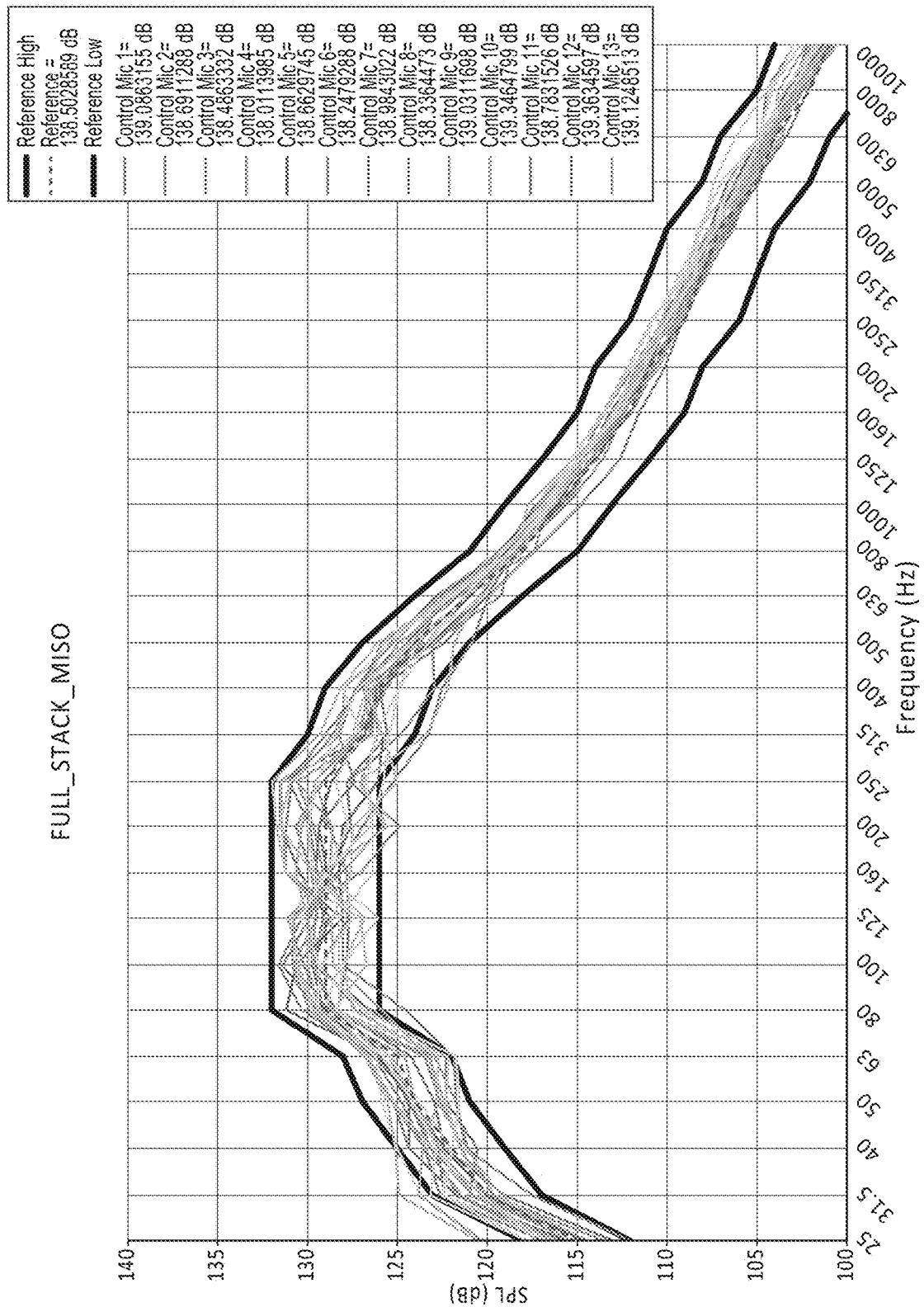
FIGS. 10a-10c show the acoustic spectra of the test volume for the Fully Populated Configuration, the Flat Dummy Panel Configuration, and the Diffuser Dummy Panel Configuration, each with MIMO control MISO control
Figure 10B:
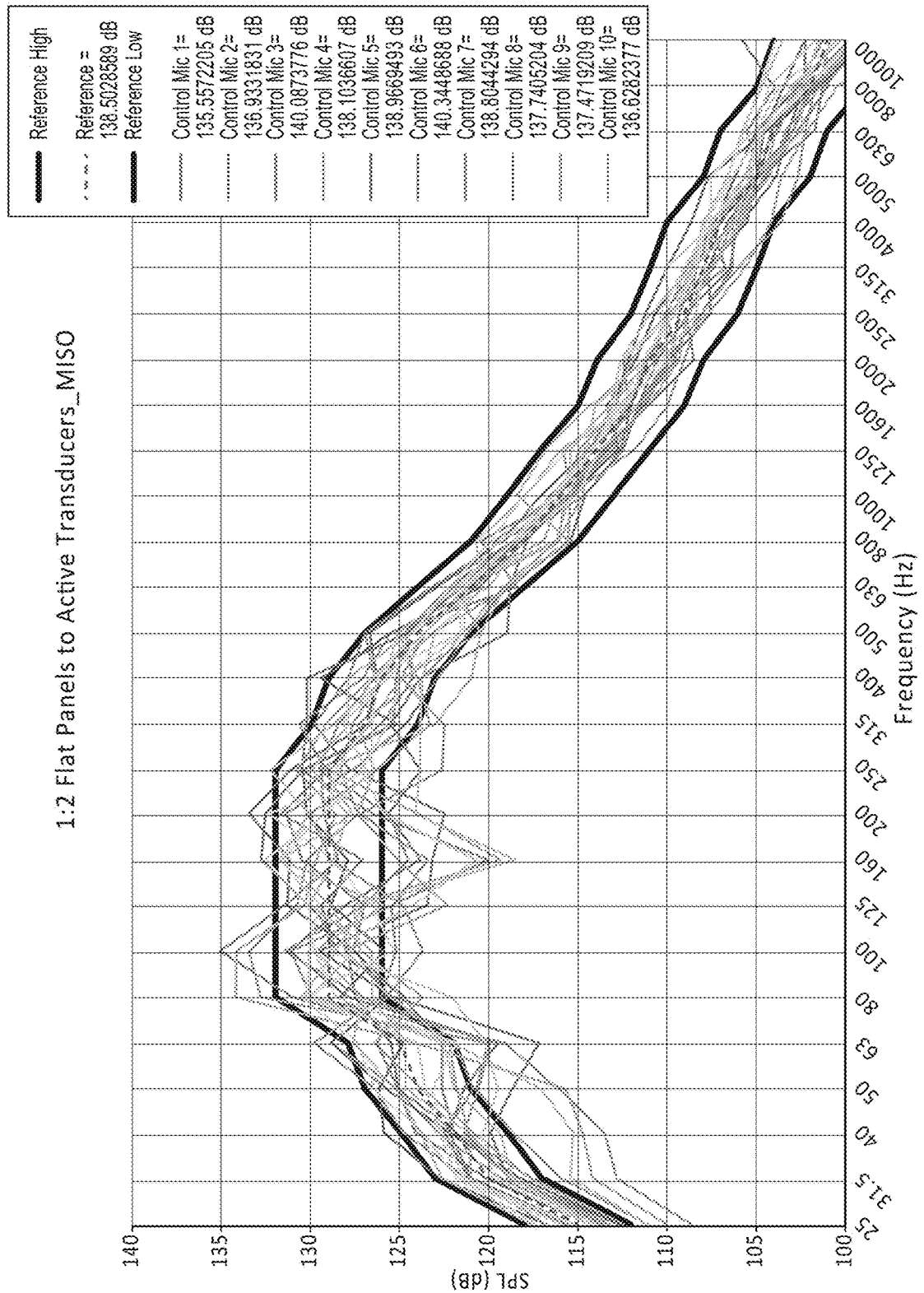
Figure 10C:
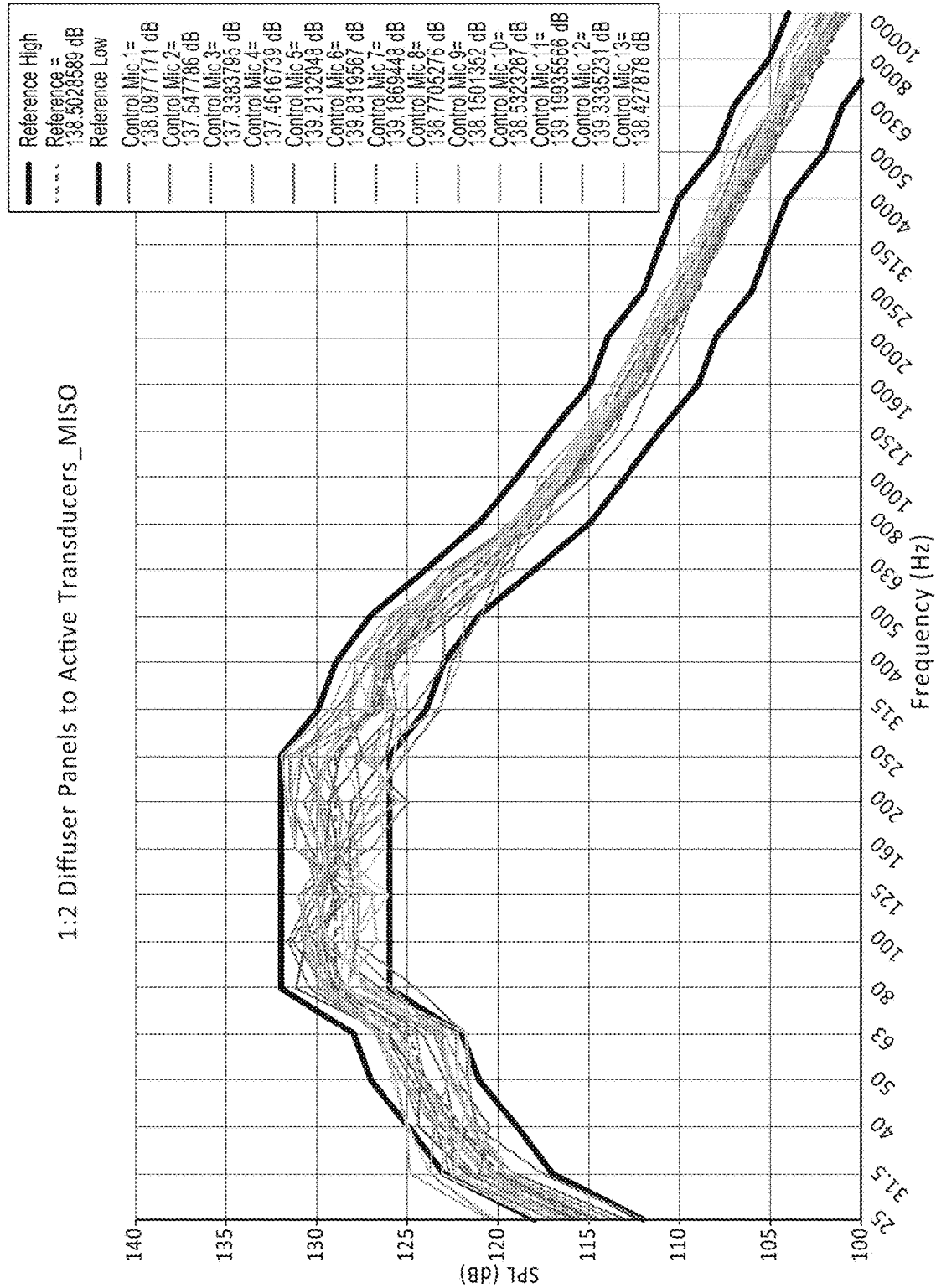

FIGS. 10a-10c shows the acoustic spectra of the test volume of the Fully Populated Configuration, the Flat Dummy Panel Configuration, and the Acoustic Diffuser Dummy Panel Configuration, respectively, each with MISO control. As can be seen in FIG. 10c, control to the target spectrum is quite good for the Acoustic Diffuser Dummy Panel Configuration and very similar to the Fully Populated Configuration (FIG. 10a). However, control for the Flat Dummy Panel Configuration is poor, as shown in FIG. 10b.

Figure 11A:
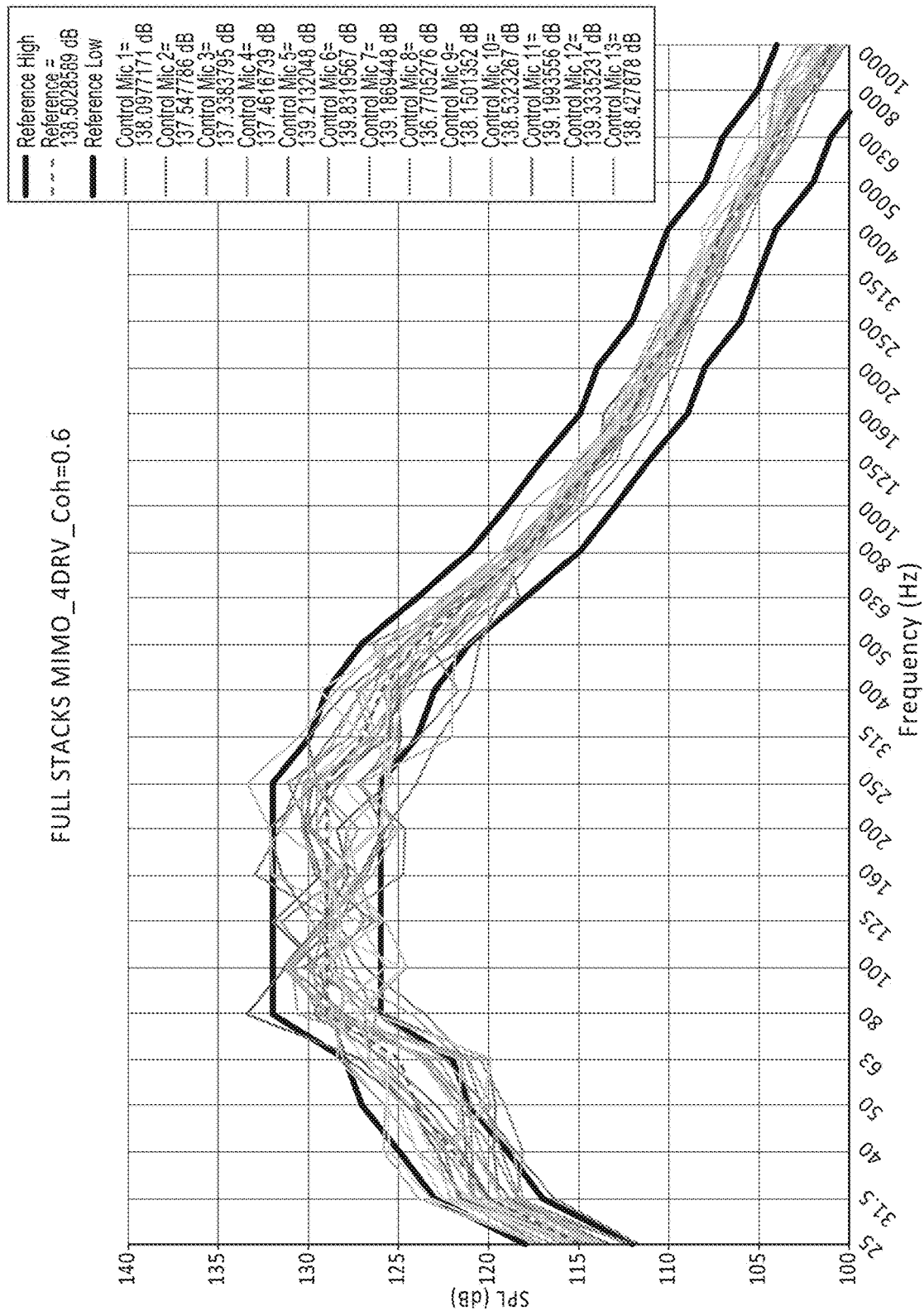
FIGS. 11a-11c shows the acoustic spectra of the test volume for the Fully Populated Configuration, the Flat Dummy Panel Configuration, and the Diffuser Dummy Panel Configuration, each with MIMO control with coherence=0.6.
Figure 11B:
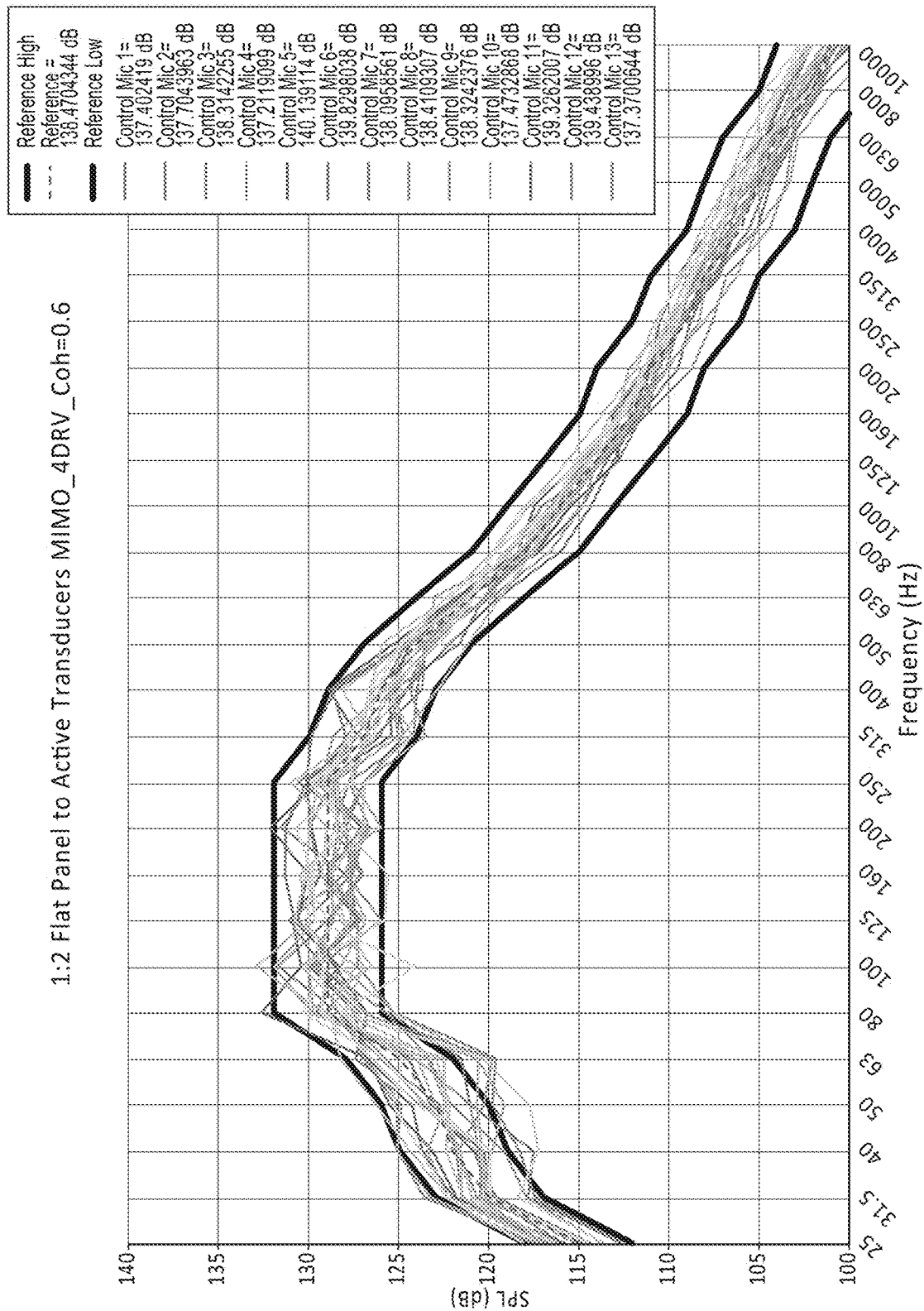
Figure 11C:
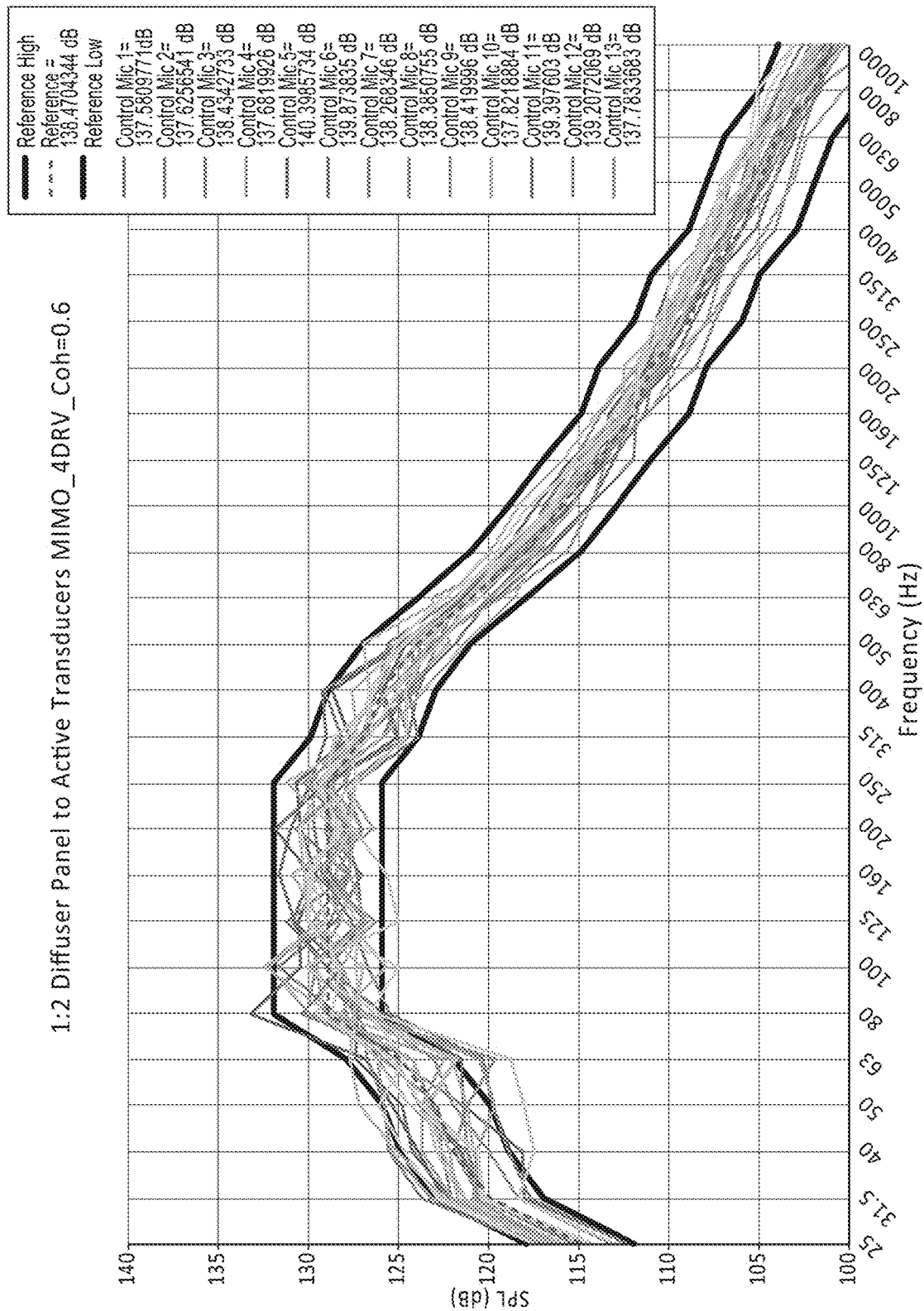

FIGS. 11a-11c shows the acoustic spectra of the test volume for each of the three configurations for MIMO control with coherence=0.6. As can be seen in FIGS. 11a-11c, the Flat Dummy Panel Configuration (FIG. 11b) and the Acoustic Diffuser Dummy Panel Configuration (FIG. 11c) are very similar, achieve excellent control and both achieve generally better control than the Fully Populated Configuration (FIG. 11a).

Figure 12A:
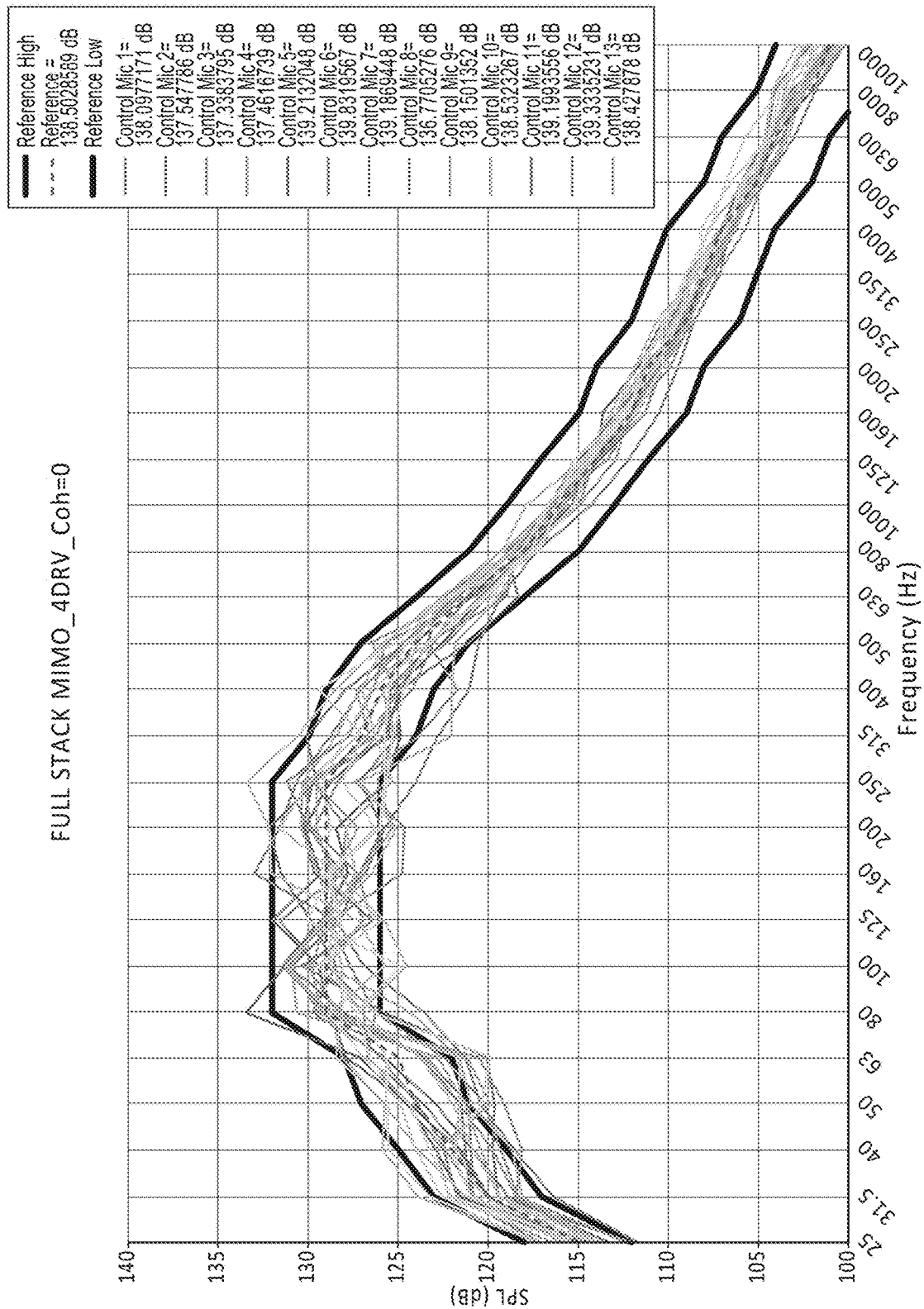
FIGS. 12a-12c, shows the acoustic spectra of the test volume for the Fully Populated Configuration, the Flat Dummy Panel Configuration, and the Diffuser Dummy Panel Configuration, each with MIMO control and coherence=0.0.
Figure 12B:
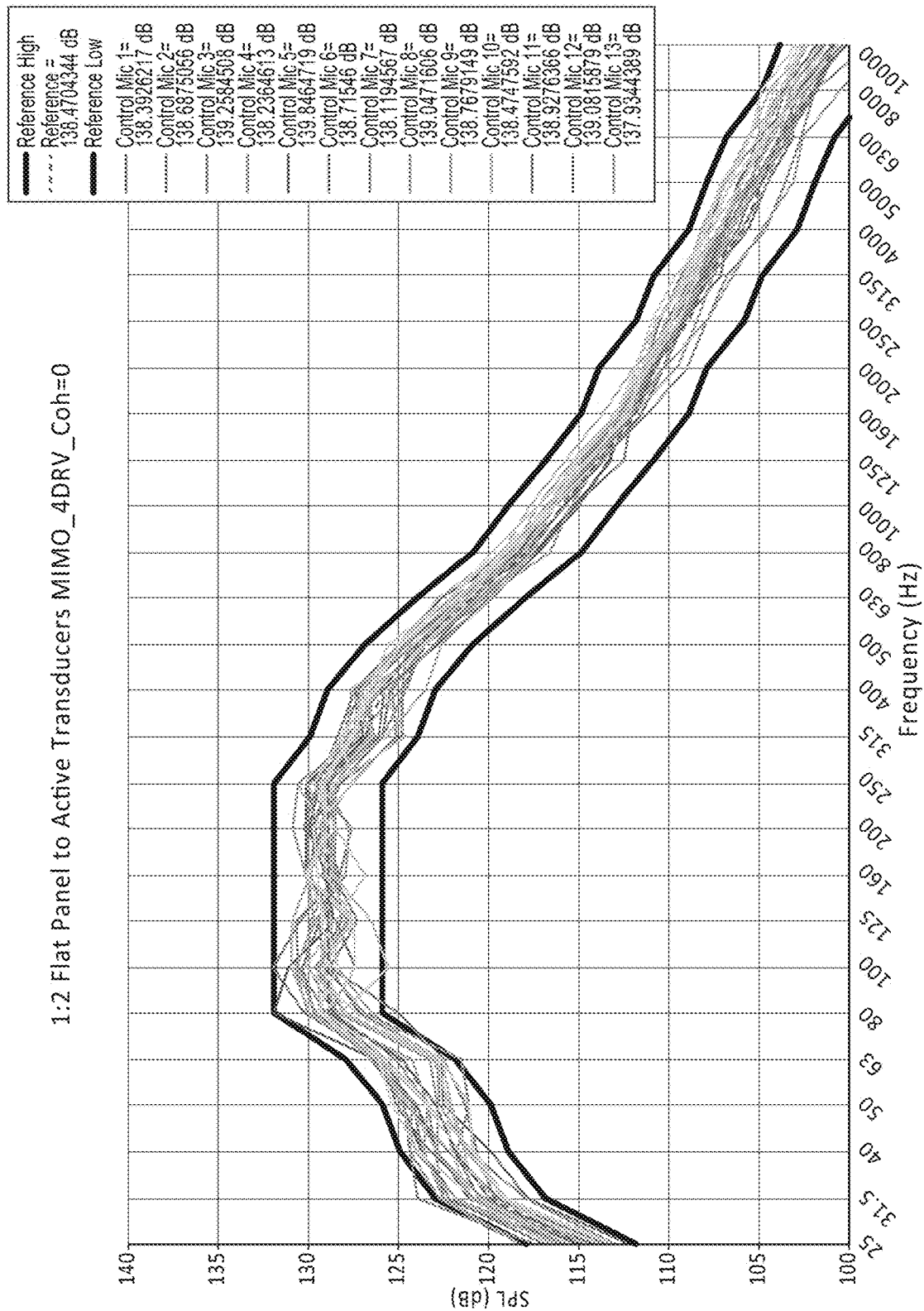
Figure 12C:
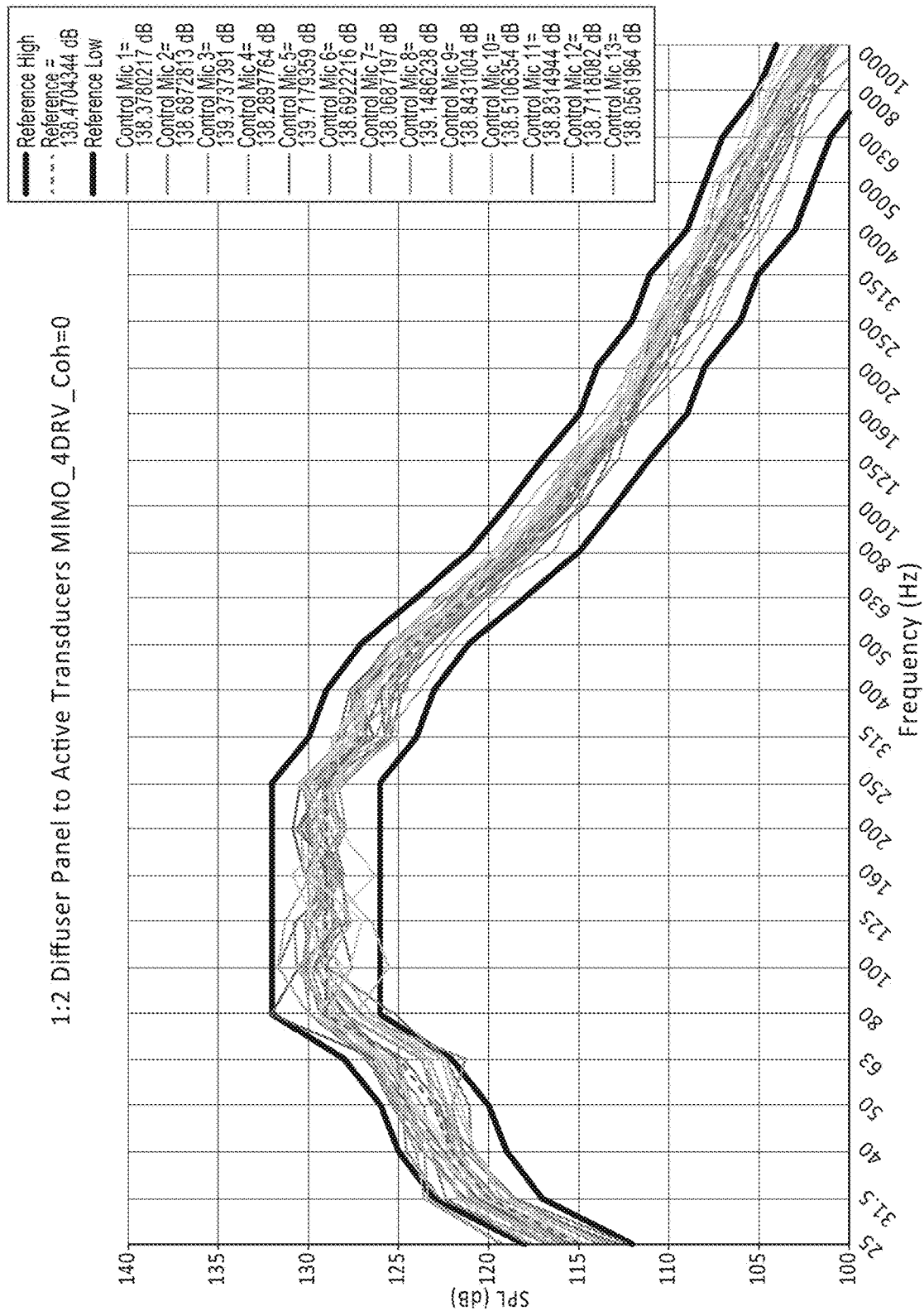

FIGS. 12a-12c show the acoustic spectra of the test volume for each of the three configurations for MIMO control with coherence=0. As with coherence=0.6, the Flat Dummy Panel Configuration (FIG. 11b) and the Acoustic Diffuser Dummy Panel Configuration (FIG. 11b) are very similar, achieve excellent control and both achieve generally better control than the Fully Populated Configuration (FIG. 11a).

It is clear from these results that the strategy of Reduced Acoustic Power Density, RAPD, employed in this embodiment is a viable method of more effectively utilizing smaller numbers of higher output DFAT acoustic transducers, such as those disclosed in the present invention, to perform lower level Direct Field Acoustic Tests. As will be apparent to those skilled in the art there are many, many different possible configurations that fall within the scope of the present invention. By way of example and not of limitation, another embodiment of this aspect of the present invention would be to apply RAPD to the DFAT system of FIG. 3. If the acoustic transducers of FIG. 3 are capable of $APD_{max}=46$ Awatts/$S_T m^2$, previously determined as the minimum required to reach 149 db OASPL, it can be easily calculated how many active acoustic transducers would be required to perform a lower-level test.

$$RAPD = 1 - \frac{1}{10^{\left(\frac{MaxTestLevel-LowerTestLevel}{10}\right)}}$$

For a 145 db OASPL test with the same target spectrum RAPD=0.60. This indicates that 50% of the active acoustic transducers could be replaced with dummy panels in the system of FIG. 3 and there still would be significant headroom to perform the 145 db OASPL test with the same spectrum shape as the spectrum of FIG. 2. For a 143.5 db OASPL test, two-thirds of the active acoustic transducers couple be replaced with dummy panels.

There are some limitations. Due to the somewhat unpredictable interactions between the different types of dummy panels and the control algorithms, it is typically impractical to apply RAPD to DFAT systems whose active acoustic transducers do not have the capability of performing a DFAT with an OASPL of at least 149 db, which implies $APD_{max} \geq 46$ Awatts/$S_T m^2$. Better, of course, is to apply RAPD to DFAT systems whose active acoustic transducers have the capability of performing a DFAT with an OASPL of more than 150 db which implies $APD_{max} \geq 57.9$ Awatts/$S_T m^2$ as previously determined.

It will be apparent to those skilled in the art that there are many possible dummy panel configurations that fall within the scope of the present invention. Dummy panels do not have to match the size or shape of the active acoustic transducers they are replacing and may also fractionally replace active acoustic transducers. However, since the maximum average absorption observed in DFAT systems is approximately $\bar{\alpha}=0.26$, the absorption of the dummy panels should be less than $\bar{\alpha}=0.26$ to avoid decreasing the reverberation time and, thereby, increasing the relative acoustic power requirements. Empty spaces, of course, have an absorption of $\bar{\alpha}=1.0$.

Further, experiments have shown that replacing more than 75% of the active acoustic transducers with dummy panels, regardless of configuration, results in poor control and may damage the transducers or other equipment. Therefore, application of RAPD≥0.75 should be avoided.

Within the scope of the present invention many different arrangements of dummy panels are possible. However, arrangements which evenly distribute dummy panels and avoid clumps of adjacent panels appear to work best.

Therefore, all DFAT systems whose active acoustic transducers have $APD_{max} \geq 46$ Awatts/$S_T m^2$ for a given test spectrum and have a ratio of active acoustic transducer radiating area to non-radiating areas with $\bar{\alpha} \leq 0.26$ that is greater than 0.33, excluding the Unit Under Test and the floor area, are within the scope of the embodiments of the present invention directed to dummy panels. The term "approximately" as used herein to refer to dimensions means within 10% of the stated dimension.

It should be understood that various embodiments disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques).

The invention claimed is:

1. A direct field acoustic testing system (DFAT) comprising:
   at least one control microphone;
   at least one controller operatively coupled to the control microphone such that the controller receives at least one input signal from the control microphone and produces at least one output signal; and
   a plurality of acoustic transducer groups, each transducer group including at least one active acoustic transducer which receives an electronic signal from the controller, wherein an average acoustic power density of the direct field acoustic testing system for a pre-determined acoustic test spectrum is equal to or greater than 46 acoustic watts per square meter of total radiating surface area of all the active acoustic transducers in the DFAT system.

2. The direct field acoustic testing system of claim 1, wherein the pre-determined acoustic test spectrum specifies an overall sound pressure level (OASPL) of at least 149 db.

3. The direct field acoustic testing system of claim 1, wherein the average power density of the direct field acoustic testing system for the pre-determined acoustic test spectrum is equal to or greater than 57.9 acoustic watts per square meter of total radiating surface area of all the active acoustic transducers in the DFAT system.

4. The direct field acoustic testing system of claim 3, wherein the pre-determined acoustic test spectrum specifies an overall sound pressure level (OASPL) of at least 150 db.

5. The direct field acoustic testing system of claim 1, wherein the plurality of acoustic transducers each operate over the same frequency range.

6. The direct field acoustic testing system of claim 1, wherein the plurality of acoustic transducers includes acoustic transducers having different frequency ranges.

7. The direct field acoustic testing system of claim 1, wherein the pre-determined acoustic test spectrum specifies a difference in the specified acoustic output of a frequency band with the greatest acoustic level specification and a frequency band with the lowest, non-zero acoustic level specification of at least 3 db sound pressure level (SPL).

8. The direct field acoustic testing system of claim 7, wherein the difference is at least 6 db SPL.

9. The direct field acoustic testing system of claim 7, wherein the difference is at least 9 db SPL.

10. The direct field acoustic testing system of claim 1, wherein: the plurality of acoustic transducer groups are arranged in a generally cylindrical configuration around a unit under test, the configuration having an inside diameter between 2.0 meters and 10.0 meters and a height between 70% and 160% of the inside diameter.

11. The direct field acoustic testing system of claim 1, wherein the plurality of acoustic transducer groups are arranged in a closed arrangement of acoustic transducers in vertical stacks having a height of between 70% and 160% of a diameter of a circle with an equivalent floor area of the closed arrangement.

12. The direct field acoustic testing system of claim 11, wherein the closed arrangement is a circle, oval, rectangle, or square.

13. The direct field acoustic testing system of claim 1, wherein at least some of the acoustic transducer groups include at least one dummy panel.

14. The direct field acoustic testing system of claim 13, wherein the dummy panels have an average absorption ratio less than or equal to 0.26.

15. The direct field acoustic testing system of claim 13, wherein the dummy panels are approximately the same size and shape of the active acoustic transducers.

16. The direct field acoustic testing system of claim 13, wherein the dummy panels are flat dummy panels.

17. The direct field acoustic testing system of claim 13, wherein the dummy panels are acoustic diffuser dummy panels.

18. The direct field acoustic testing system of claim 13, wherein a ratio of a total surface area of the dummy panels to the total active radiating surface area of all of the acoustic transducers in the DFAT system is at least 0.33.

19. The direct field acoustic testing system of claim 18, wherein the ratio is less than 0.75.

20. The direct field acoustic testing system of claim 1, wherein each acoustic transducer group includes the entire range of frequencies of the acoustic test spectrum.

21. The direct field acoustic testing system of claim 1, wherein the test spectrum includes a plurality of frequency ranges, wherein at least one transducer group of the plurality of transducer groups does not cover all of the entire range of frequencies in the acoustic test spectrum.

* * * * *